(12) United States Patent
Carloganu et al.

(10) Patent No.: US 6,226,749 B1
(45) Date of Patent: May 1, 2001

(54) METHOD AND APPARATUS FOR OPERATING RESOURCES UNDER CONTROL OF A SECURITY MODULE OR OTHER SECURE PROCESSOR

(75) Inventors: Marius M. Carloganu, Draveil (FR); John F. Sheets, Irvine, CA (US)

(73) Assignee: Hewlett-Packard Company, Palo Alto, CA (US)

(*) Notice: Subject to any disclaimer, the term of this patent is extended or adjusted under 35 U.S.C. 154(b) by 0 days.

(21) Appl. No.: 08/983,518

(22) PCT Filed: Jul. 26, 1996

(86) PCT No.: PCT/US96/11837
§ 371 Date: Jul. 6, 1998
§ 102(e) Date: Jul. 6, 1998

(87) PCT Pub. No.: WO97/05551
PCT Pub. Date: Feb. 13, 1997

Related U.S. Application Data
(60) Provisional application No. 60/001,671, filed on Jul. 31, 1995.

(51) Int. Cl.[7] ................................................ G06F 13/14
(52) U.S. Cl. ............................................................. 713/201
(58) Field of Search ................................. 713/200, 201, 713/202, 166, 154; 711/164, 163

(56) References Cited

U.S. PATENT DOCUMENTS 5,469,556 * 11/1995 Clifton ................................. 711/163
5,802,590 * 9/1998 Draves ................................. 711/164

* cited by examiner

Primary Examiner—Tod Swann
Assistant Examiner—Matthew Smithers

(57) ABSTRACT

A method and apparatus for operating a set of resources under the control of a secure processor, e.g. security module, having a command authentication means and a command execution means, to achieve secure control of the resources. The secure processor stores a set of command primitives for functional control of the resources. A set of defined commands for invoking command primitives has either a secured command format including a command sequence ID, a command code, and a set of command data items or a non-secured command format including a command code and a set of command data items. The secure processor stores a command set up table including command type flags to designate each command as a secured command or a non-secured command. An application program running in an external device includes a plurality of the defined commands in either secured command format or the non-secured command format and these are sent one at a time to the secure processor for execution. The secure processor looks up each received command in the command set up table, and if the command is a non-secured command it immediately executes associated command primitives. If the command is a secured command, the secure processor tests both its authenticity and regularity and only executes the associated command primitives if the command passes both tests.

24 Claims, 13 Drawing Sheets

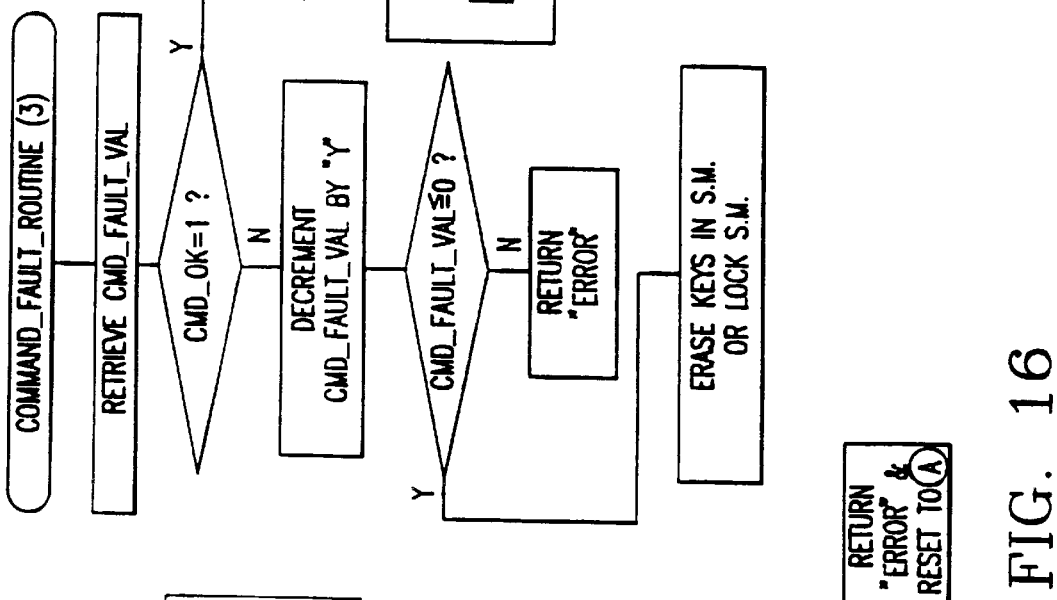
FIG. 17
FIG. 16
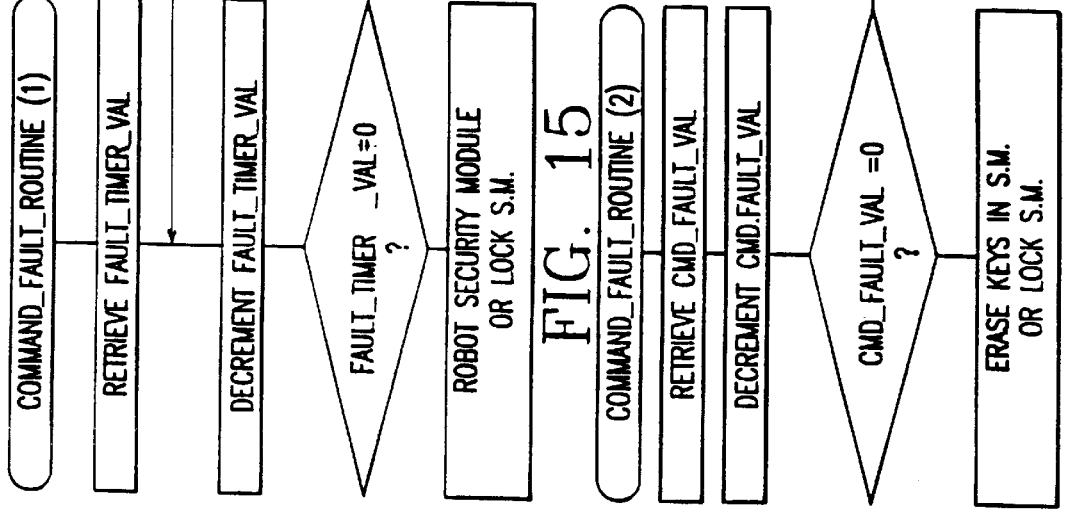
FIG. 15

METHOD AND APPARATUS FOR OPERATING RESOURCES UNDER CONTROL OF A SECURITY MODULE OR OTHER SECURE PROCESSOR

This Appln is a 371 of PCT/US96/11837 filed Jul. 26, 1996 and also claims the benefit of Provisional No. 60/001,671 filed Jul. 31, 1995.

FIELD OF THE INVENTION

This invention relates generally to secure data processing systems which utilize a security module to control access to a set of secured resources such as a keyboard and a display. This invention also relates generally to secure processing systems which are secure by the nature of their location, e.g. personal computer in a private home or office.

BACKGROUND OF THE INVENTION

Encryption security is a well known feature of modern data processing systems. The general features of encryption security for data transmissions and PIN codes are described in many prior art references such as Atalla U.S. Pat. Nos. 4,268,715, 4,283,599, and 4,288,659.

It is also well known in the art to protect certain critical portions of data processing systems and real time control systems by placing security critical resources under the control of a security module which, as is well known, may include various levels of physical and logical security.

Some examples of logical and physical security features for security modules are discussed in the following references:

Levien U.S. Pat. No. 4,523,271
Double U.S. Pat. No. 5,027,397
Unsworth U.S. Pat. No. 5,353,350
IBM U.S. Pat. No. 5,388,156
Gilbarco U.S. Pat. No. 5,448,638
NCR U.S. Pat. No. 4,593,384
UK patent 1,248,763, FIG. 1 illustrates one type of security module system. Security module 10 is protected by physical security features 23 and controls a set of security module resources 24, 25, 26 and 27. These resources may be internal or external to the security module, but typically only resources which themselves require physical security due to their nature and function, e.g. encryption using stored keys and algorithms, are located within the security module to save costs.

Application processing unit 20 communicates with security module 10 over command and data bus 21 and directly controls operation of non-secured resources 28. A secured application program 40 is stored in security module 10. An application software program 30 is stored in and executed in application processing unit 20. Program 20 includes security module commands which invoke the fixed secured application program in the security module.

This secured application program may be a single application program module or a plurality of application program modules, each of which may be invoked with a specific different security module command. It will be apparent that this prior art approach only allows the application software programmer to operate the secured resources using fixed program resources having predefined functionality. If the application software programmer want to do other functions with the secured resources, a custom security module with additional secured application program modules would be required. In most cases the cost of such a customized security module would not be warranted by the added value that can be achieved. The application software programmer must utilize duplicate resources (e.g. a second display or keypad) and control them directly by application processing unit 20. It is apparent that there is a need for a method and apparatus for operating a security module and associated resources in a more flexible and effective manner that allows an application software program running outside the security module to access critical resources controlled by the security module in a secured manner.

OBJECTS OF THIS INVENTION

It is a principal object of this invention to provide an improved method and apparatus for operating resources under the control of a security module or other secure processor.

It is another object of this invention to provide a method and apparatus for operating a security module or other secure processor which allows an external application software program to access critical resources in a secured manner.

It is another object of this invention to provide a method and apparatus for operating a security module or other secure processor in which all of the application software program resides in an external application processing unit.

It is another object of this invention to provide an apparatus and method for operating a security module or other secure processor using predefined commands which can be either secured or non-secured depending on the needs of the application and security considerations.

FEATURES AND ADVANTAGES OF THIS INVENTION

One aspect of this invention features a method for operating a set of resources under the control of a secure processor having a command authentication means involving providing in the security module a set of command primitives for functional control of the set of secured resources, each of the command primitives having an associated set of command data items.

A secured command format is defined for commands to invoke the command primitives, the secured command format including a command sequence ID, a command code, and a set of command data items. An application program is prepared comprising a sequence of secured commands each having the secured command format. The secured commands of the application software program are sent one at a time to the security module for execution.

The authenticity of each of the secured commands is tested by the security module based on the value of at least one element of the secured command using the command authentication means. The regularity of each of the secured commands is tested based on the value of the command sequence ID. The command primitive associated with the command code in each of the secured commands is then executed if and only if the secured command passes both the command sequence and the command authenticity testing steps. In one embodiment of the method of this invention, the sequence of commands in the application program are required to be executed by the security module in an ordered numerical sequence. In such an embodiment, the command sequence testing is carried out by testing whether the value of the command sequence ID is equal to the value of a next command sequence ID maintained in the security module, i.e. the Nxt_Seq_ID is incremented by 1 as each command is executed.

In another embodiment of the method of this invention, the command sequence ID in the secured command format is a current command sequence ID and the secured command format further includes a next command sequence ID. In this embodiment, the command sequence testing comprises testing whether the value of the current command sequence ID is equal to the value of the next command sequence ID obtained from the secured command just previously executed by the security module.

The step of executing the command primitive includes storing the next command sequence ID if the secured command passes the command authenticity testing step. In this embodiment. the application program may comprise a series of secured commands having a set of different execution path branches.

Preferably, the secured command format includes a message authentication code signature value calculated using an encryption key and at least a portion of the content of the secured command. Command authentication testing is carried out by first calculating a test message authentication code signature value using one of the same or a paired encryption key stored in the security module and the same portion of the content of the secured command received by the security module. Following this, the message authentication code signature value in the secured command is checked to determine if it matches the test message authentication code signature value. If it matches, the command is authenticated; and if not, the command is declared to be faulty.

A currently preferred embodiment of this invention incorporates a feature of a command set up table and associated elements which provide added flexibility in that each of the defined commands can be treated as either a secured command or a non-secured command. This embodiment involves a method for operating a set of resources under the control of a secure processor having a command authentication means and a command execution means. The elements of the method of this preferred embodiment are the following:

a. providing in the secure processor a set of command primitives for functional control of the set of secure resources;

b. defining a set of commands to invoke the command primitives;

c. defining a secured command format for the commands including at least a command sequence ID, a command code, and a set of command data items;

d. defining a non-secured command format for the commands including a command code and a set of command data items;

e. storing in the secure processor a command set up table including for each of the commands in the set of commands a command type flag having a first value if the command is a secured command and a second value if the command is a non-secured command;

f. preparing an application program comprising a plurality of commands each having one of the secured command format or the non-secured command format;

g. sending the sequence of commands one at a time to the secure processor for execution;

h. looking up each command in the command set up table when the command is received by the secure processor;

i.1. if step h. determines that the command is a non-secured command, then executing a set of command primitives associated with the command using the command execution means; and i.2. if step h. determines that the command is a secured command, then i.2.a. testing the authenticity of the secured command based on the value of at least one element of the secured command using the command authentication means, i.2.b. testing the regularity of the secured command based on the value of the command sequence ID, and i.2.c. executing the set of command primitives associated with the secured command using the command execution means, if and only if the secured command passes both the testing steps i.2.a. and i.2.b Another aspect of this invention features a security module apparatus or, more generally, a secure processor for controlling the operation of a set of resources in response to secured commands communicated thereto from a application processing unit. The application processing unit stores an application software program comprising a sequence of the secured commands, as well as commands for general resources directly under the control of the application processing unit.

The secured commands have a predefined secured command format comprising a command sequence ID, a command code, and a set of command execution data items. The security module has means for interfacing with the resources under its control, a command authentication means, and means storing a predefined set of command primitives for functional control of the set of secured resources, each of the command primitives having an associated set of command data items required for execution thereof.

The security module further comprises means storing a command execution program comprising the following:

means for interpreting a command received from the application processing unit in the secured command format, means for testing the authenticity of the command based on the value of at least one element of the secured command using the command authentication means, mean for testing the regularity of the command based on the value of the command sequence ID, and means executing the command primitive associated with the command code in the command if and only if the command passes both the authenticity testing and the regularity testing of the command execution program.

A preferred embodiment of such a secure processor implements the feature of allowing each of the defined commands to be either a secured command or a non-secured command depending on the content of a command set up table. The secure processor apparatus controls the operation of a set of secure processor resources in response to commands communicated thereto from a separate application processing unit. The application processing unit stores an application software program comprising a sequence of commands, each comprising one of a prearranged set of commands and having one of a pair of predefined command formats:

a first command format is associated with a secured command and comprises at least a command sequence ID, a command code, and a set of command data items; and a second command format is associated with a non-secured command and comprises a command code and a set of command data items.

The secure processor apparatus in accordance with this invention has the following elements:

an interface to the secure processor resources;

a secured command authentication means;

a memory portion storing a predefined set of command primitives for functional control of the set of secured resources;

a memory portion storing a command set up table including for each of the commands in the set of commands a command type flag having a first value if the command is to be processed as a secured command and a second value if the command is to be processed as a non-secured command; and a command execution program.

The command execution program includes elements to carry out the following functions:

receiving and storing a command from the application processing unit;

looking up the command in the command set up table to determine if the command is a secured command or a non-secured command;

testing the authenticity of a secured command based on the value of at least one element of the secured command using the command authentication means, testing the regularity of a secured command based on the value of the command sequence ID;

if the command look up determines that the command is a non-secured command, executing a set of command primitives associated with the command command without use of authenticity testing or regularity testing if the command look up means determines that the command is a secured command, executing a set of command primitives associated with command if and only if the command passes the tests of both the authenticity testing means and theregularity testing means.

Other features of this invention comprise the use of random or pseudorandom authenticity testing for commands which include a large amount of data. The command data is divided into a plurality of subsets and a MAC is calculated on each subset and sent with the command. In the processing of the command, a random number in the range from 1 to the number of MAC items in the command and only the single MAC associated with that data set is calculated and compared to the version in the command itself to authenticate the command.

Another feature of this invention is the use of command fault actions of various types to protect the secure processor and its systems without destroying the functionality of the unit under circumstances of command faults created by noise and other conditions.

It should be apparent that the method and apparatus of this invention provides the advantage of substantial additional flexibility of operation of the critical or secured resources without compromising the overall security of the security module and the resources. Of course, the secured commands and the command primitives that they invoke must be secure in the sense that the functions that they carry out must not compromise the overall system security. This is assured by using a trusted party to audit the command primitives and the application software program which utilizes the secured commands.

The trusted party will, in most cases, authorize the use of the audited secured commands in an application by appending a cryptographic signature to each of the said commands, so that authenticity verification can be performed at run-time.

It should be clear that a security module will refuse authenticity checks and secured commands execution if it does not contain the secret (key or paired key) used for authentication. In most situations only a trusted party may load the security module with that secret, thus definitively bounding the audited and executed commands by the a secret sharing.

This invention provides the flexibility of storing a portion of the application software program in the security module and invoking those portions with security module commands and then overlaying this operation with secured commands that carry out other functions using the secured resources. Alternatively, all of the secured resources may be operated based on invoking command primitives with secured commands. Alternatively, and preferably, the system and method uses a command set up table to designate each commands as a secured command or a non-secured command so that the same command primitives can be used and the application programmer can choose, dynamically during program execution, which commands are secured and which are not.

The commands used to modify the set-up table are secured commands and need to be audited. The secured command system can be designed to allow great flexibility in program branching and conditional branching as desired.

Using the method and apparatus of this invention, greatly increased flexibility in application software program control of security module resources can be achieved without dramatically increasing the cost of the security module.

Other objects, features, and advantages of this invention will become apparent from a consideration of the detailed description of various embodiments set forth below, and the appended claims, taken in conjunction with the drawings forming a part of this specification.

BRIEF DESCRIPTION OF DRAWING FIGURES

FIGS. 15–17 are flow charts of alternative command fault routines which may be used in the command processing routine illustrated in FIG. 14.

DETAILED DESCRIPTION OF VARIOUS INVENTION EMBODIMENTS

Figure 1:
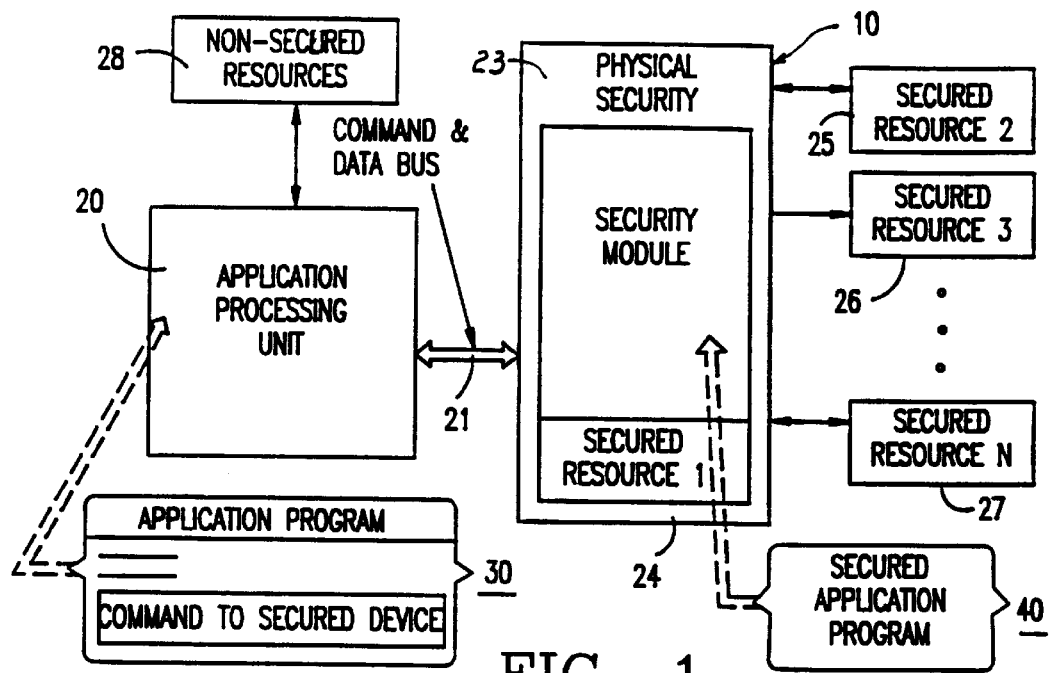
FIG. 1 is a block schematic diagram illustrating the structure and function of apparatus and method for operating a security module in accordance with the prior art concepts.
Figure 2:
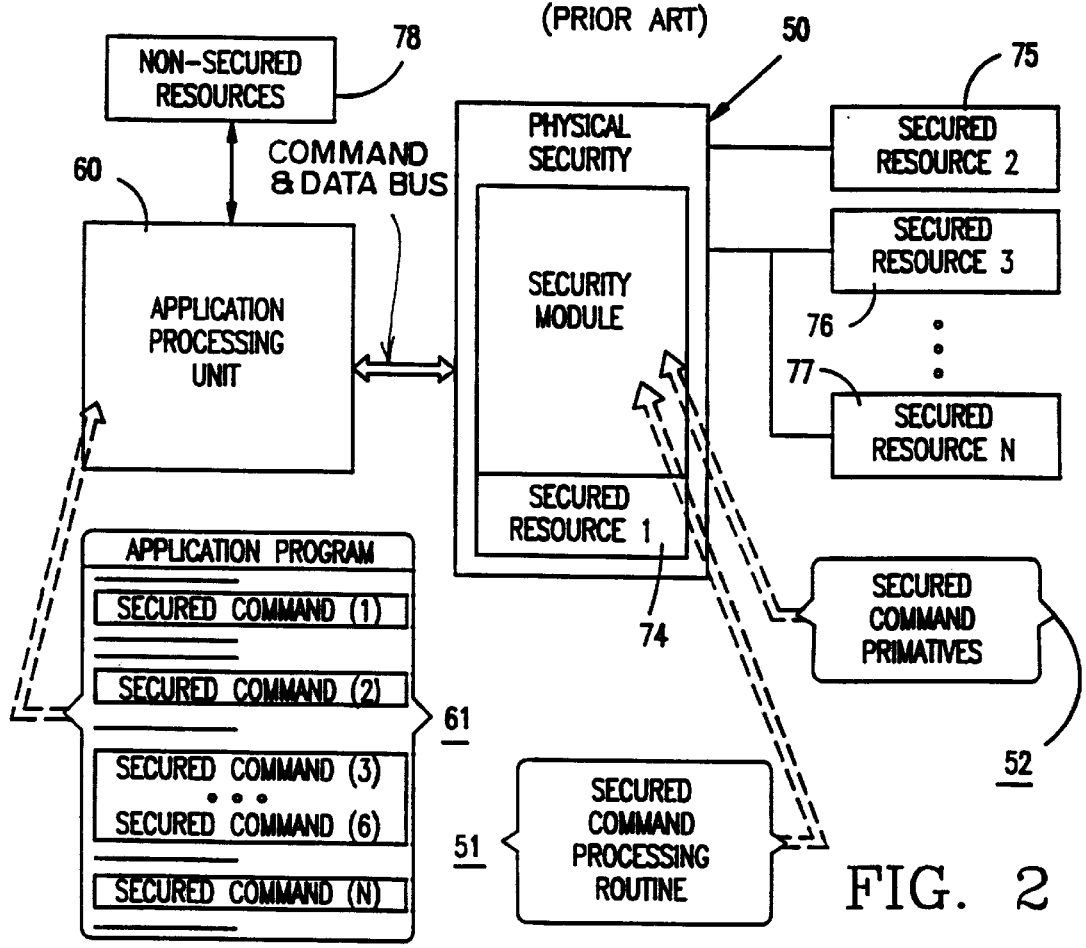
FIG. 2 is a block schematic diagram illustrating the structure and function of apparatus and method for operating a security module in accordance with this invention.

Referring now to FIG. 2, the method and apparatus of this invention utilizes a security module 50 which stores a set of secured command primitives 52 and a secured command processing routine 51. Application processing unit 60 stores a application software program 61 which includes a plurality of secured commands that are sent to security module 50 where they are processed using secured command processing routine 51 which will invoke operation of associated command primitives if the command passes sequence and authenticity testing involved in this invention.

Secured resources 74 through 77 are interfaced to the processor in security module 50 [[either directly or via a shared interface. The term "secured resource" is used to denote a resource under the control of the security module to distinguish from non-secured resources controlled by application processing unit 78. The term does not mean that the resources have their own physical or logical security features, though some may have such features.]] Secured resources can thus be flexibly operated by application software program 61 to the degree of the functionality provided by secured command primitives 52. Primitives 52 can be and preferably are general operating routines for the secured resources. As will be discussed in detail below, security is provided by rigorous sequence and authenticity testing of the secured commands. This feature of the invention prevents attackers from accessing the secured resources with Trojan horse programs that interrupt or replace commands in an authorized application software program running in application processing unit 60.

Figure 3:
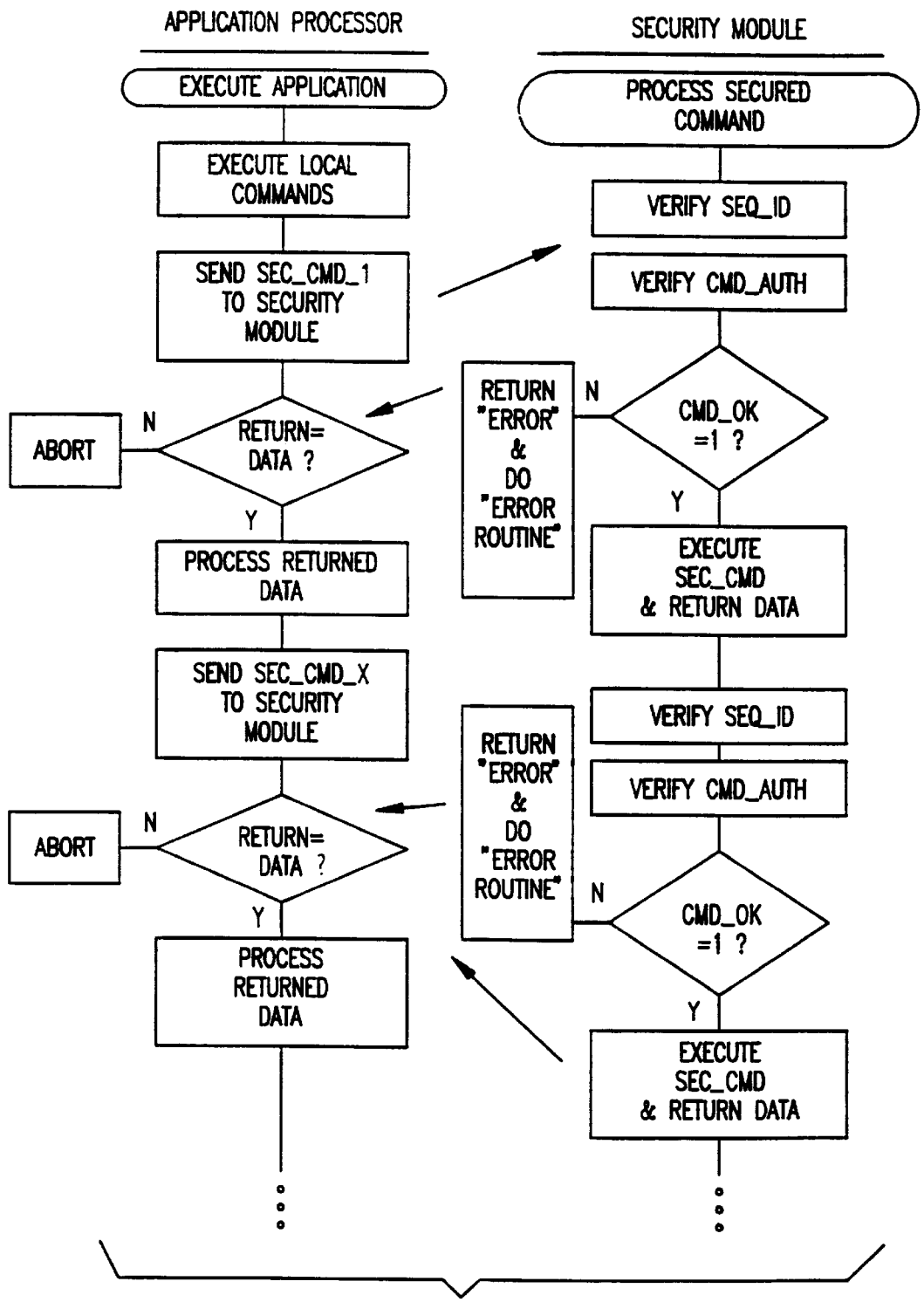
FIG. 3 is a software flow chart illustrating one embodiment of the operation of a security module and application processing unit in accordance with this invention.

FIG. 3 illustrates a conjoint operation of application processing unit 60 and security module 50 in accordance with one embodiment of apparatus and method of this invention. The application software program stored in application processing unit 60 may be, and mostly likely is, a combination of local commands and secured commands. Local commands directly operate non-secured resources interfaced 78 to application processing unit 60 or operate on data received from security module 50 in response to execution of a secured command therein.

FIG. 3 is very general and is intended simply to show that secured commands are sent in sequence to security module 50 and each command is processed by a Process Secured Command program module therein as part of secured command processing routine 51. This module includes two separate routines: Verify Seq_ID and Verify CMD_Auth, followed by testing if the CMD_OK flag value is 1, and then executing the secured command if YES is returned or returning an "error" if NO is returned in this testing step. The various forms of these verification routines will be discussed below in conjunction with other drawing figures.

First the general broad aspects of an apparatus and method in accordance with this invention will be discussed. In its broadest terms the method, as illustrated FIGS. 2 and 3, involves operating a set of resources to be secured [here denoted 'secured resource' for convenience] under the control of a security module having a command authentication means. The command authentication means may take a number of forms as will be discussed. As previously discussed the invention involves providing in security module 50 a set of command primitives 52 for functional control of a set of secured resources 74 to 77 with each of said command primitives having an associated set of command data items. Persons of skill in the programming art readily understand what command primitives involve to provide for operation of various kinds of resources, like keyboards and displays, and what data items are required for their execution, like the display data and location for operating a display. More detail about this aspect of the invention is thus not required. This invention further involves defining a secured command format for commands to invoke said command primitives, said secured command format including a command sequence ID, a command code, and a set of command data items. This is the most general form of the secured command format since, in some embodiments, the command sequence ID can serve for both sequence and authenticity validation of the secured command. For example, in an embodiment in which command sequence is required to be sequential and the security module itself tracks the Nxt_Seq_ID, the command sequence ID can be encrypted as part of the step of preparing an application software program. When decrypted in the security module as part of secured command processing routine 51, the secured command is simultaneously authenticated and checked as to sequence, i.e. if the Seq_ID for current command, tracked in the security module, matches the expected Nxt_Seq_ID which is generally part of the previous secured command.

As noted the invention involves preparing an application program comprising a sequence of secured commands each having said secured command format, and sending said sequence of secured commands one at a time to said security module for execution. In the security module, the process secured command module tests the authenticity of each of said secured commands based on the value of at least one element of said secured command using command authentication means, and tests the regularity of each of said secured commands based on the value of said command sequence ID. As noted authenticity may be tested by decrypting the entire secured command and verifying the regularity of the Seq_ID. Alternatively the secured command may include a separate CMD_Auth data item in the form of an encrypted authentication mark common to each command, or a MAC signature calculated over all command data individually for each command. The Process Secured command routine executes the command primitive or primitives associated with said command code in each of said secured commands if and only if said secured command passes both the sequence and authenticity testing steps.

Figure 5:
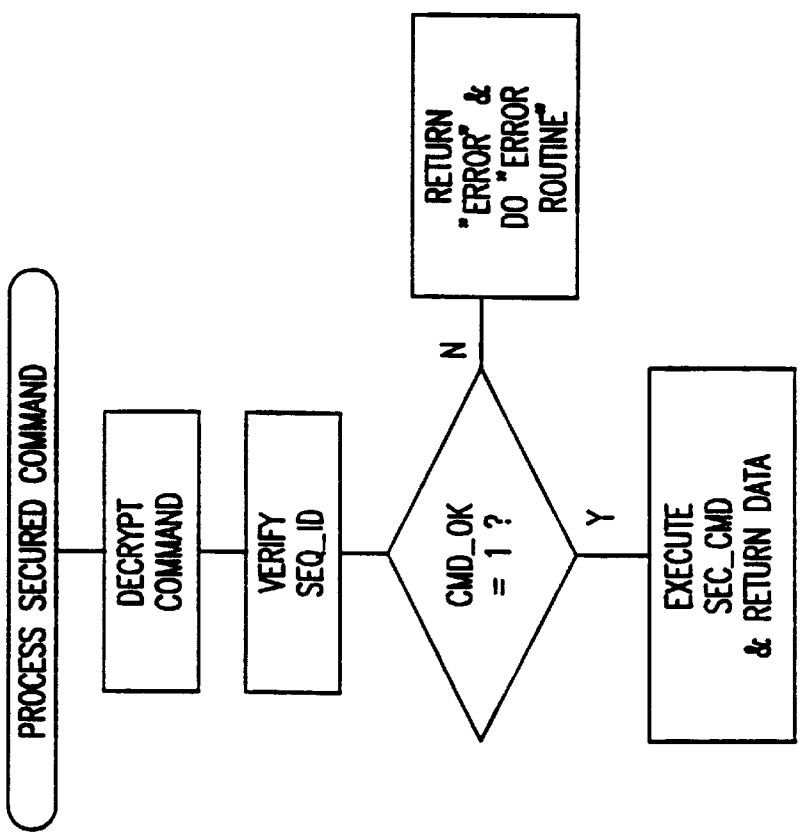

FIG. 5 illustrates the case of an embodiment of this invention in which the Seq_ID serves both authenticity and sequence verification based on decrypting the command and then running a Verify Seq_ID routine.

Figure 6:
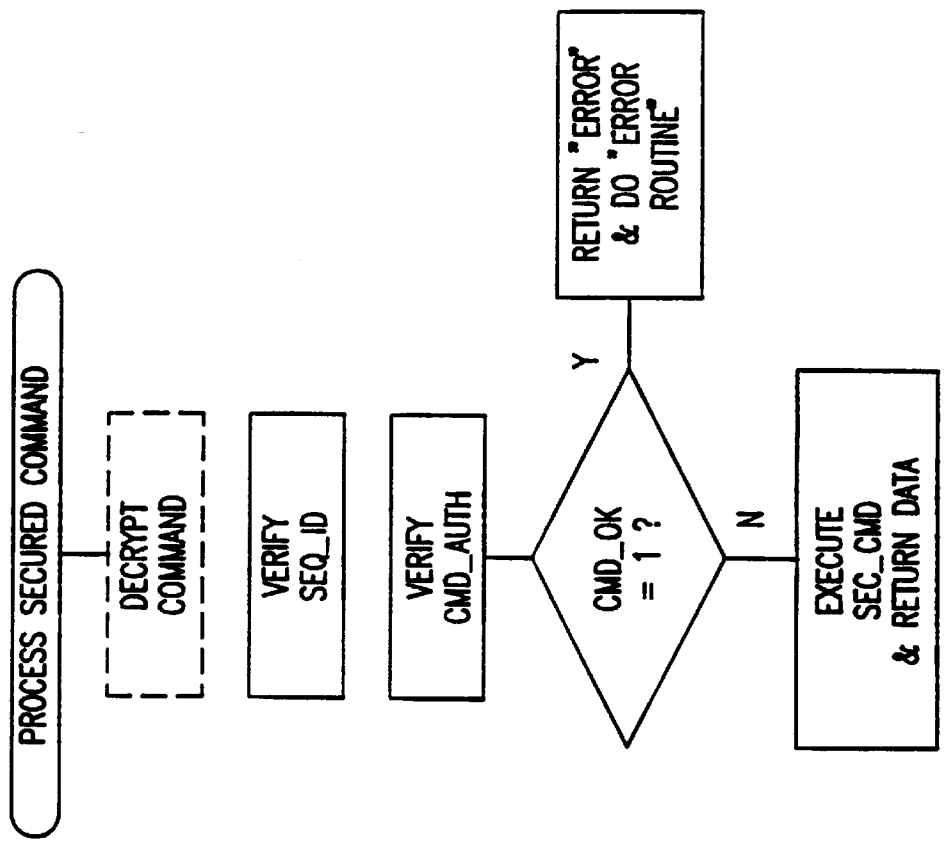
FIGS. 5 and 6 are software flow charts illustrating alternative embodiments of a method in accordance with this invention for processing a secured command in a security module.

FIG. 6 illustrates that the secured command or some portion thereof may, as one option, be encrypted for additional security against attack. In such an embodiment a decryption of the secured command (or predetermined portion) is performed before the Verify Seq_ID routine and Verify CMD_Auth routine are executed. For example, each secured command in the application software program could have a common CMD_Auth value which is encrypted. After decryption in the security module, the Verify CMD_Auth routine would simply verify that the decrypted value of CMD_Auth is the expected one for each command.

Figure 9:
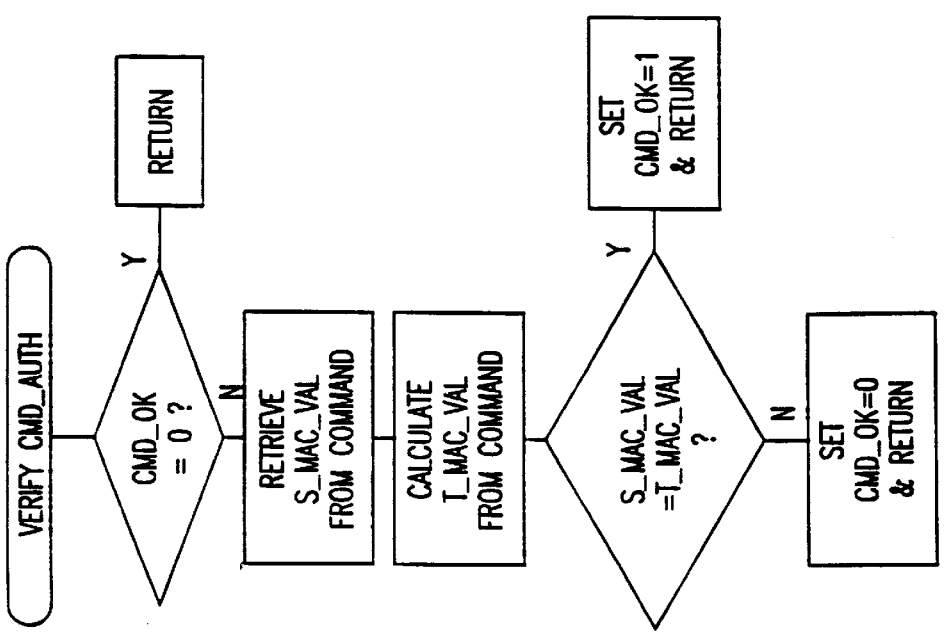
FIG. 9 is software flow chart illustrating one embodiment in accordance with this invention for verifying the command authenticity of a secured command as part of the apparatus and method of this invention.

FIG. 9 illustrates a Verify CMD_Auth routine which is used in an embodiment which uses a secured command format in which each command includes an S_MAC_Val in the form of a message authentication code (MAC) signature based on subjecting a predefined portion of the command, such as the data block, to processing through an encryption algorithm using a key which is the same as, or paired with, the one provided in the security module. The security module can then test the authenticity of each secured command as shown in FIG. 9 by calculating a T_MAC_Val from the received command and comparing T_MAC_Val and S_MAC_Val to see if they are equal.

It should be apparent that this approach could also be overlaid with an overall command encryption step which would make successful attack much more difficult. An attacker would have to find a way to issue commands that are intelligible to the security module after decryption as well as pass the Verify Seq_ID routine and Verify CMD_Auth routine in the security module.

Figure 8:
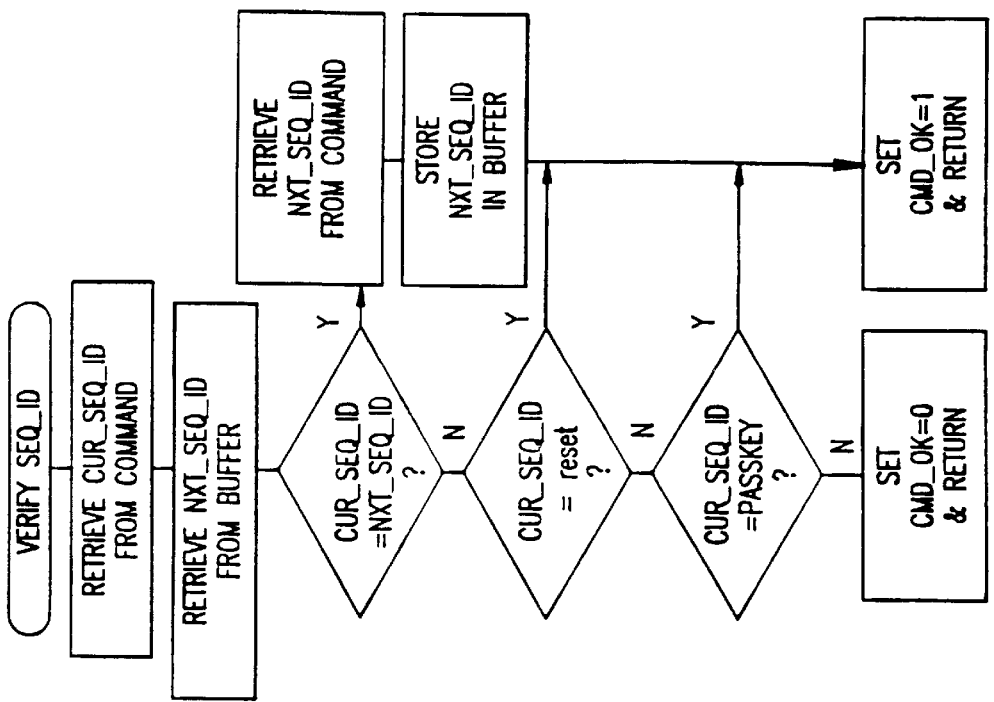
FIGS. 7 and 8 are software flow charts illustrating alternative embodiments of a method in accordance with this invention for verifying the sequence identification (Seq_ID) of a secured command as part of the apparatus and method of this invention.
Figure 7:
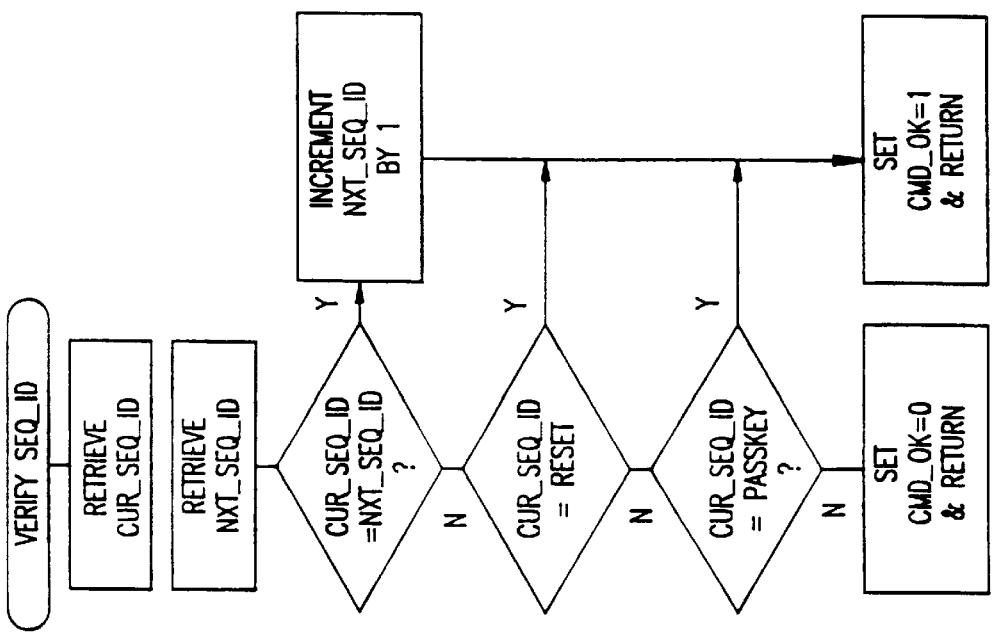

FIGS. 7 and 8 illustrate alternative versions of Verify Seq_ID routines. The version of FIG. 7 is for an embodiment of the invention which requires the secured commands to be executed in strict numerical sequence. The first step involves retrieving the value of Cur_Seq_ID from the secured command followed by the step of retrieving the Nxt_Seq_ID from a buffer in security module 60. This is followed by the step of testing if Cur_Seq_ID is equal to Nxt_Seq_ID. If it is, Nxt_Seq_ID is incremented by 1 and CMD_OK is set to 1. If not, then two other possibilities are tested to determine if a reset is to be performed or an authorized passkey value is present. The latter two tests allow flexibility for the application software programmer to perform diagnostic, recovery, testing and general quit and re-start functions on the security module and are not necessarily needed in executing an application software program.

FIG. 8 illustrates an embodiment in which alternative execution paths for secured commands are allowed and the secured command format includes a Nxt_Seq_ID value as part of the secured command itself. In this routine, the difference is that the Nxt_Seq_ID from the command itself is stored in the buffer that is provided in the security module for that parameter if the sequence verification testing step returns YES. This allows the application software programmer much more flexibility in designing the flow of secured commands in the application software program. An example of use of this additional flexibility is discussed below.

It should be understood that Cur_Seq_ID and Nxt_Seq_ID parameters are not limited to numeric values, but can take any appropriate form that does not conflict with other aspects of the system.

Figure 10:
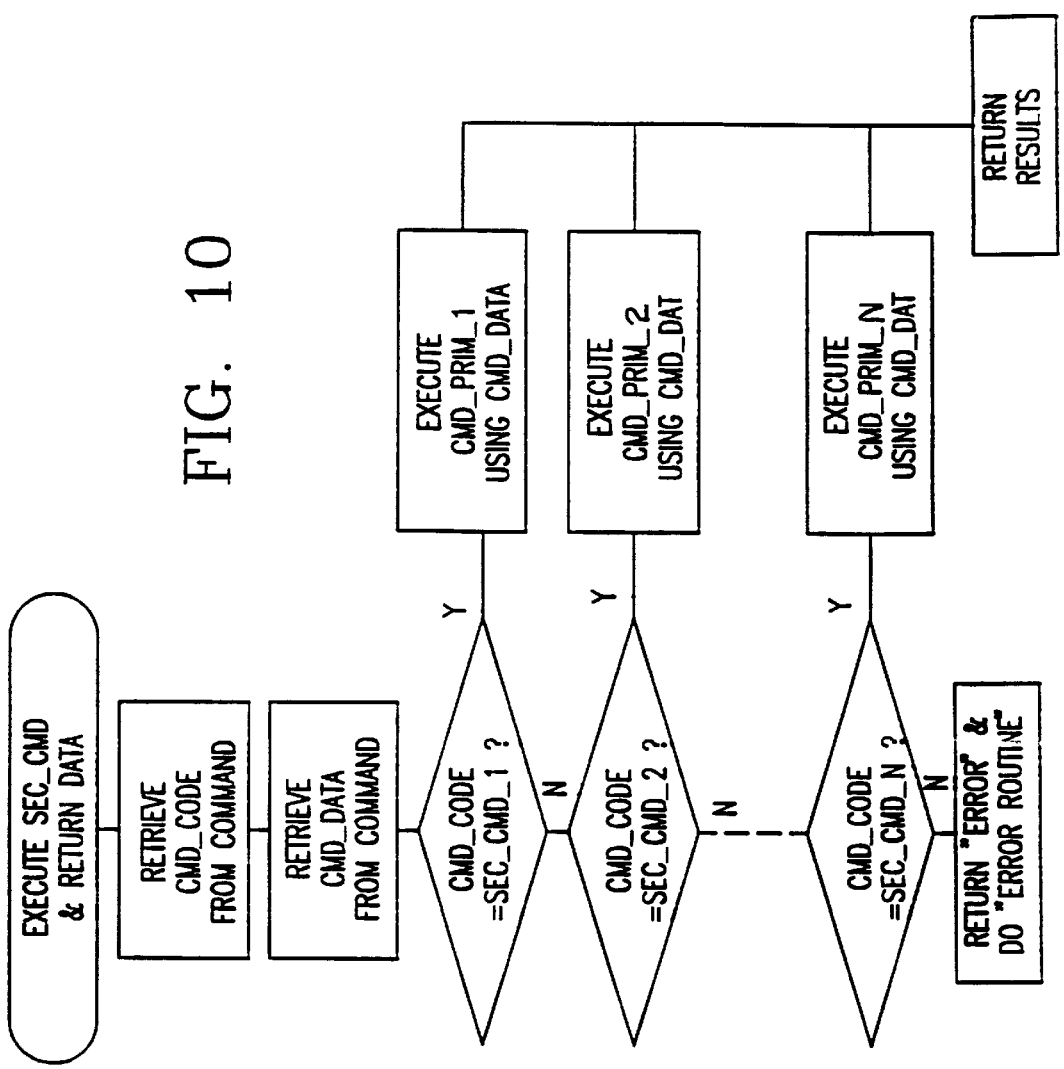
FIG. 10 is a software flow chart illustrating generally the steps of a routine in accordance with this invention for executing secured commands as part of the apparatus and method of this invention.

FIG. 10 illustrates the steps of a routine to execute a secured command after passing the sequence and authenticity tests. This is a straightforward "case statement" type routine that executes whatever command primitive routine that matches the command code of the secured command. If the command code doesn't match any of the command primitives, an error is returned.

Figure 4:
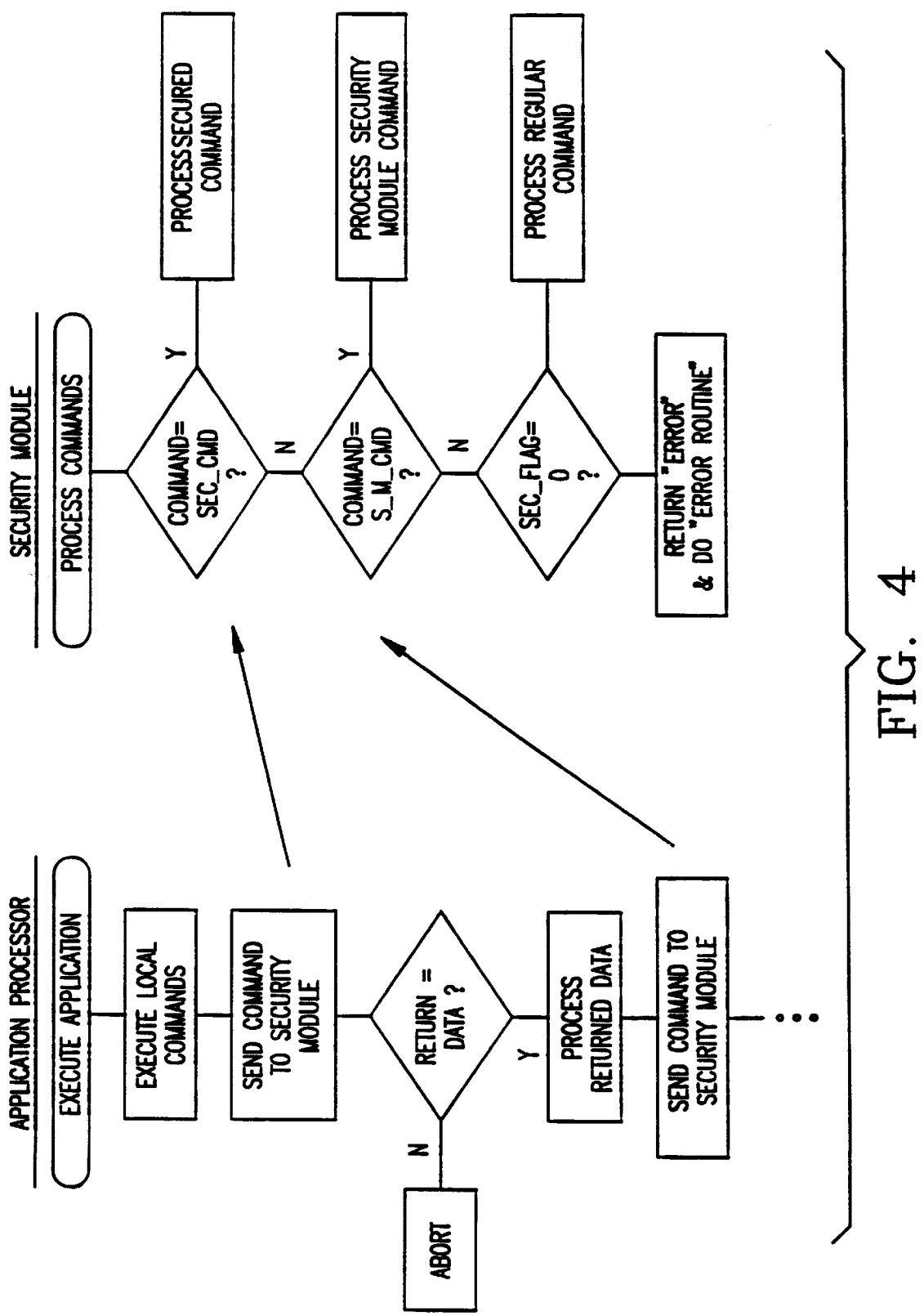
FIG. 4 is a software flow chart illustrating another embodiment of the operation of a security module and application processing unit in accordance with this invention.

FIG. 4 illustrates an embodiment of this invention in which the secured commands concept is utilized in a security module which may also process security module commands as in the prior art. The security module can also process regular (or free) commands when a secured command turns off the security of the system to allow free access to secured resources or when the command set up table allows such processing. In this case the security module has a routine to analyze the type of command received and then invoke the appropriate command processing routine. This embodiment also illustrates the feature of this invention that involves permitting a secured command to turn off the security module testing of commands to allow regular commands to access the secured resources.

Figure 11:
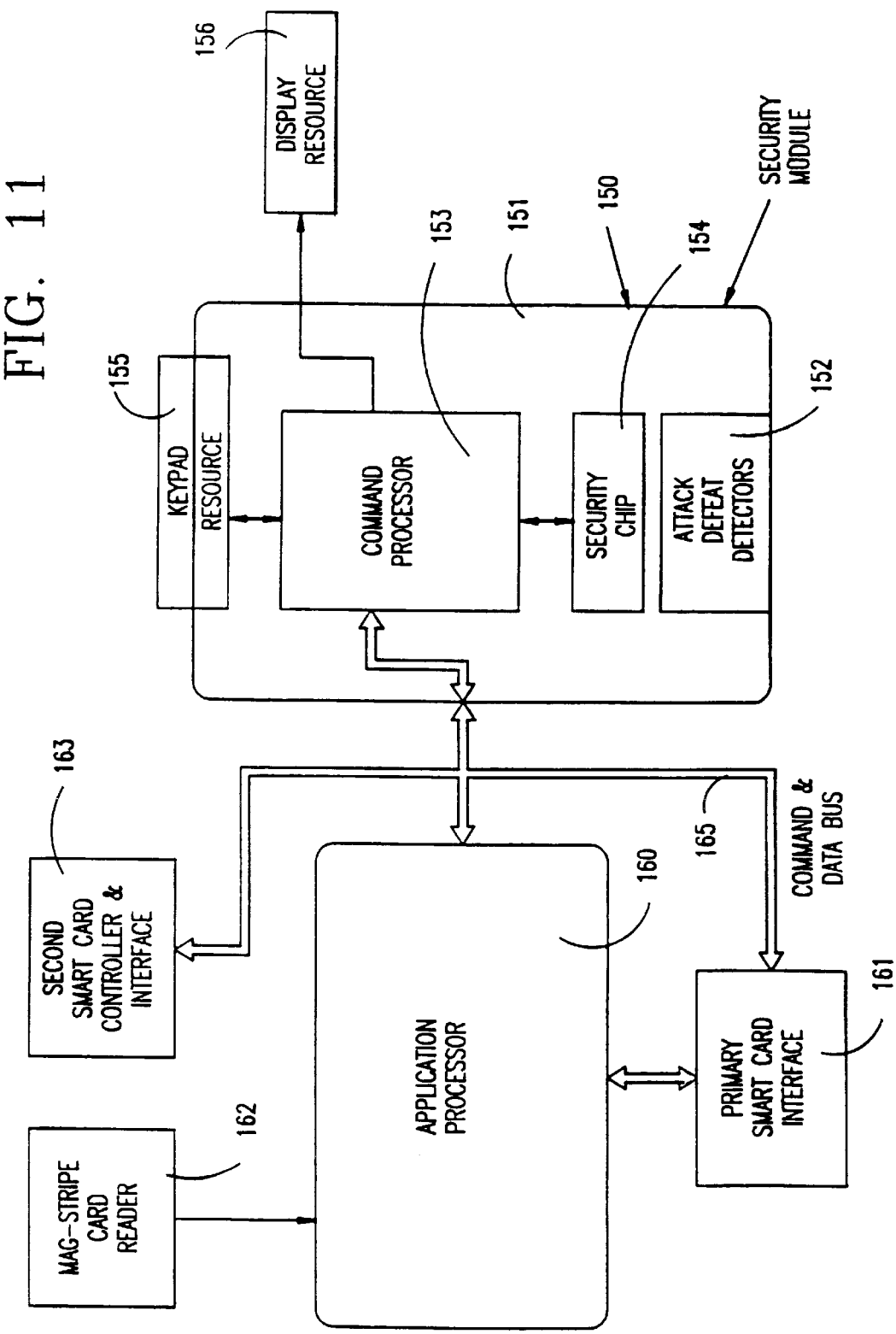
FIG. 11 is a block schematic diagram of one specific system application of the method and apparatus of this invention, namely a secured PIN-Pad apparatus.

FIG. 11 illustrates a specific system in which the method and apparatus of this invention may be deployed. The system is a secured PIN-Pad in which a keypad resource 155 and a display resource 156 operate under the control of command processor 153 in security module 150. An internal security chip also provides encryption and other resources to the security module 150. Application processing unit 160 is outside the security module and controls the operations of a mag-stripe card reader 162, a primary smart card reader/writer interface 161 and a second smart card controller and interface 163. Application processor 160 communicates with external devices via communications port 164. Application processor 160 communicates with security module 150 via command and data bus 165.

Security module 150 includes attack defeat detectors and subsystems 152 which may include any of the devices and subsystems well known in this art. A security chip 154 is provided in security module 150 to store encryption keys and to perform command authentication functions when requested by command processor 153. The use of a separate security chip with its own security features provides a cost advantage at present, but it should be understood that this invention is not limited to such a security module architecture and could be implemented in a one chip system or a multi-chip system.

To illustrate how several embodiments of the method and apparatus of this invention would be utilized in such a system, a couple of examples will be discussed.

Example 1 Regular Ordered Command Sequence

The following is an example of a short secured application software program using a mixture of non-secured and secured commands in a strict ordered command sequence and using digital signatures (e.g a MAC Signature) for command authentication:

Seq_ID Cmd_Code Cmd_Data Signature

001 Display_Fxd_Data "Enter PIN" S_MAC_Val (cmd Arg_001)

002 Get_Encrypt_Kb_Data (Key Source) S_MAC_Val (cmd Arg_002)

003 Display_Fxd_Data "Pump No.?" S_MAC_Val (cmd Arg_003) cursor position numbering—>012345678

004 Set_cursor_secured (8) S_MAC_Val (cmd Arg_004)

N/A Get_Clr_Kb_Byte NULL NONE (assume the entered value is "7")

005 Display_Free_Data "8,1",'7' S_MAC_Val (cmd Arg_005) (at this moment the display shows the message "Pump no.7")

S_MAC_Val is a signature calculated upon the Seq_id number and typically the command code. For "fixed" secured commands, i.e. ones that contain no variable data, that fixed data is also input to the signature algorithm.

In this example, the only secured command that has variable data is the one with Seq_id=005. It allows the display of one variable character, on the 8th position of the display. The data used for input to signature calculation does not include the character to display, i.e. it does not include the '5' value, which was returned by previous command.

For non-secured commands, there is no Seq_id and no signature, but a a survey is done to determine whether they may or may not be executed.

The first command in this application software program is a secured command that invokes a command primitive in the security module to display a fixed data item and sets a flag in the security module that the next command must invoke a command primitive that provides for both a blind display of entered keyboard data and encryption of that data so that only encrypted data will be returned to the application program.

Referring to FIG. 3, the security module would receive this command and verify the Seq_ID. In this case the expected Seq_ID is 001 so that command passes that test. The security module would then verify the command authenticity by calculating a T_MAC_Val and comparing it to S_MAC_Val (001). Assuming the S_MAC_Val is authentic, the associated command primitive is executed and the appropriate data is returned. In this case the data may be simply an indication that the command was okay and was executed by the security module.

The second command invokes a command primitive which processes keyboard data in a secure manner. The command primitive would respond to each key press that is not an "Enter" or "Cancel" key, by storing the character in the security module and echoing to the display a blind character such as the "*" character. Each entered character is handled in this manner until "Enter" is hit, and then the command primitive encrypts the stored data, typically a PIN entry and returns the encrypted value to the application software. The steps of a command primitive of this type are well known to persons of skill in this art so a more detailed description is not required here.

The security module would process this second command in the same manner, testing that the Seq_ID is 002 as expected and that the S_MAC_Val (002) is equal to a calculated T_MAC_Val for this command, and then executing the command. The command may include data specifying an encryption key source or type to be used for that entered data.

The third command in the application software program is a Display_Fxd_Data command which invokes a command primitive to display a message on the display device to prompt for 'free' data, i.e. data to which no security requirement is attached. Now, this reference to "no security requirement" means of course that the data prompted for is of such character that security is actually not required, such as the pump number at a gas station. The party auditing the application software program provides the final check on the security of the application software program. This security checking can be accomplished by internal or external auditing of the application software program by trusted people, followed by authorization which is given by means of adding digital signatures to the secured commands of the approved application.

The fourth command is a secured command to set the set the cursor at position 8 where the entered pump number is to be displayed. The fifth command is a non-secured command which invokes a command primitive to retrieve and return a keyboard byte in the clear.

The fifth command is a secured command which invokes a primitive to display the entered pump number at the appropriate position on the display Consider how an attacker might attempt to attack this secured program. The point after processing of the first secured command is one where an attacker might try to interrupt execution and send a command to the security module to attempt to obtain a return of the actual keyboard data representing the entered PIN.

Even if the attacker knew that the Seq_ID was 002, he or she wouldn't be able to forge the S_MAC_Val of the actual second command to pass the CMD_Auth test without knowing the encryption key that produces a valid S_MAC_Val for the attackers command. If the MAC signature is unforgeable and collision free, then there is no possibility for such an attack to be successful.

The same is true for any other attempt to attack security of the application software program, such as by inserting after the second command a sequence of commands to first display a phony message like "Repeat PIN Entry" and then a command to retrieve clear keyboard data. Even if the Seq_ID of these attacking commands were correct, the S_MAC_Val for each command could not be forged so the commands would not be executed by the security module.

Similarly, if the attacker tried to reorder the sequence of the commands to the security module and issue the fourth command after the first to try to retrieve PIN data in the clear, the security module would refuse to execute this out-of-sequence command even though the S_MAC_Val would otherwise authenticate the command.

The combination of verifying both command sequence and command authenticity in the security module provides greatly enhanced security while achieving flexible access to the secured resources controlled by the security module.

Example 1A Alternative secured command implementations

Example 1 above also can be used to illustrate how the secured command concept can be used in different ways. For example, the application software program might utilize a combination of secured commands, special security module commands, and regular commands (according to the arrangement illustrated in FIG. 4) and have this form:

Get_PIN

Secured_Cmd [001, Display_Fxd_Data "Pump No.?", S_MAC_Val (001)] Get_Free_Kb_Byte The first command Get_PIN is a special security module command that invokes an application program module involving a sequence of commands stored in the security module and executed to display an "Enter PIN" message, and then retrieve and encrypt the PIN entered on the keyboard, and return it to the application processing unit. The second command is a secured command that both displays free data on the display controlled by the security module and unlocks the security module, in a sense, to allow the application processing unit to obtain a free (not encrypted) keyboard byte.

This more limited use of the secured command concept provides substantial programming flexibility by allowing the application processing unit to make use of secured resources like a display and keyboard in a secured fashion.

Example 2 Branching Command Sequences

We will now discuss an example of a secured application software program using a mixture of secured, non-secured and "free" commands issued to the security module, and providing the feature of command branching depending on the results of execution at various stages of the program. In this case the format of the secured command is as follows:

Scd_Cmd [Cur_Seq_ID, Nxt_Seq_ID, Cmd_Code, Cmd_Data, S_MAC_Val]

Typically, for these secured commands the data input to signature algorithm calculation includes Cur_Seq_ID, Nxt_Seq_ID and Cmd_Code. If the Cmd_Data field contains fixed data, it generally needs to be included as well.

To provide the command branching feature, the application software program may have more than one secured commands with the same value of Cur_Seq_ID and more than one with the same value of Nxt_Seq_ID.

Here is the program example:

10 Scd_Cmd [001,010, Display_Fxd_Data, "SLIDE CARD", S_MAC_Val (Arg_10)]
20 Get_Card_Rdr_Data
30 Scd_Cmd (010,011, Display_Fxd_Data, "Enter $ Amt", S_MAC_Val (Arg_30)]
40 Scd_Cmd (011,012, Set_cursor_scrd, "8", S_MAC_Val (Arg_40)]
50 Scd_Cmd [012,013, Open_Kb_access, NULL , S_MAC_Val (Arg_50)]
60 Get_Clr_Kb_Data until "Enter"
70 Scd_Cmd [013,014, Display_Free_Data, "8,5", '05.25', S_MAC_Val (Arg_70)]
80 Scd_Cmd [014,015, Close_Kb_access, NULL , S_MAC_Val (Arg_80)]
90 If CARD_TYPE=FLEET then 200
100 Scd_Cmd [015,016, Display_Fxd_Data, "ENTER PIN", S_MAC_Val(Arg_110)]
120 GOTO 250
200 Scd_Cmd [015,022, Display_Fxd_Data, "Fleet No.?", S_MAC_Val (Arg_200)]
210 Scd_Cmd [022,027, Set_cursor_scrd, "9", S_MAC_Val (Arg_210)]
220 Scd_Cmd [027,029, Open_Kb_access, NULL, S_MAC_Val (Arg_220)]
230 Get_Clr_Kb_Data until "Enter"
240 Scd_Cmd [029,055, Display_Free_Data, "9,1",'7', S_MAC_Val (Arg_240)]
250 Scd_Cmd [055,040, Clear_display, NULL , S_MAC_Val (Arg_250)]
260 Print Transaction Receipt
270 Scd_Cmd [040,001, Display_Fxd_Data, "Take Receipt", S_MAC_Val (Arg_270)]
280 GOTO 10

The cmd_xx argument of the signature function S_MAC_Val, typically a MAC signature, includes the current and next sequence ID, the command code and the fixed part of data in the command. The variable part of data, which in this example is put between simple quotes", is not included. The fixed data in the command is either unquoted or, if it is a string, then it is between double quotes "".

Note that each of the secured commands has a unique S_MAC_Val which is used by the security module to authenticate the command. The command on line 100 and the command on line 200 each have the same value of Cur_Seq_ID since the program needs to be able to branch at line 90 depending on the card type sensed in the card read step of the program. The commands on lines 110 and 240 both have the same Nxt_Seq_ID since the next command to be executed is the same for both commands in the two different branches of the program. However, the CMD_Auth value, i.e. the S_MAC_Val in each is different because they are different commands and would MAC to a different value.

This example illustrates the embodiment of this invention in which both secured command and non-secured command are utilized. This embodiment utilizes a command set up table in the security module. This command set up table has a flag for each command or group of commands in the predefined set of security module commands. The value of this flag determines whether or not the associated command is currently a secured command. If the flag value designates the command as a secured command, all commands of this type received by the security module will be verified, i.e. their command sequence and authenticity will be checked by command processor 153. If the command flag value designates a non-secured command, the command will be executed by command processor 153 without verification of either the authenticity or the sequence ID of the command.

For commands in the application program which are security module commands but not to be processed as a secured command, the application program need not send to the security module the command verification portion of the defined command structure. In this embodiment, the command structure is altered such that all of the command verification data is placed in one portion of the command and the command and data are placed in a second portion of the command. These two portions of the command are sent sequentially to the security module if both are required. Otherwise, if the command is not a secured command, only the command and data portion is sent. If the other portion were sent, it would be ignored by the command processor running in the security module.

In this alternative embodiment, one of the security module commands is a command to reset the value of a designated command flag in the command set up table. Accordingly, the application program running in the application processing unit outside the security module can turn on and off the command security in the security module. Obviously, this makes the auditing of application programs critical to maintaining adequate security. This alternative embodiment of the apparatus and method of this invention will now be described in more detail in conjunction with FIGS. 12–21.

Figure 12:
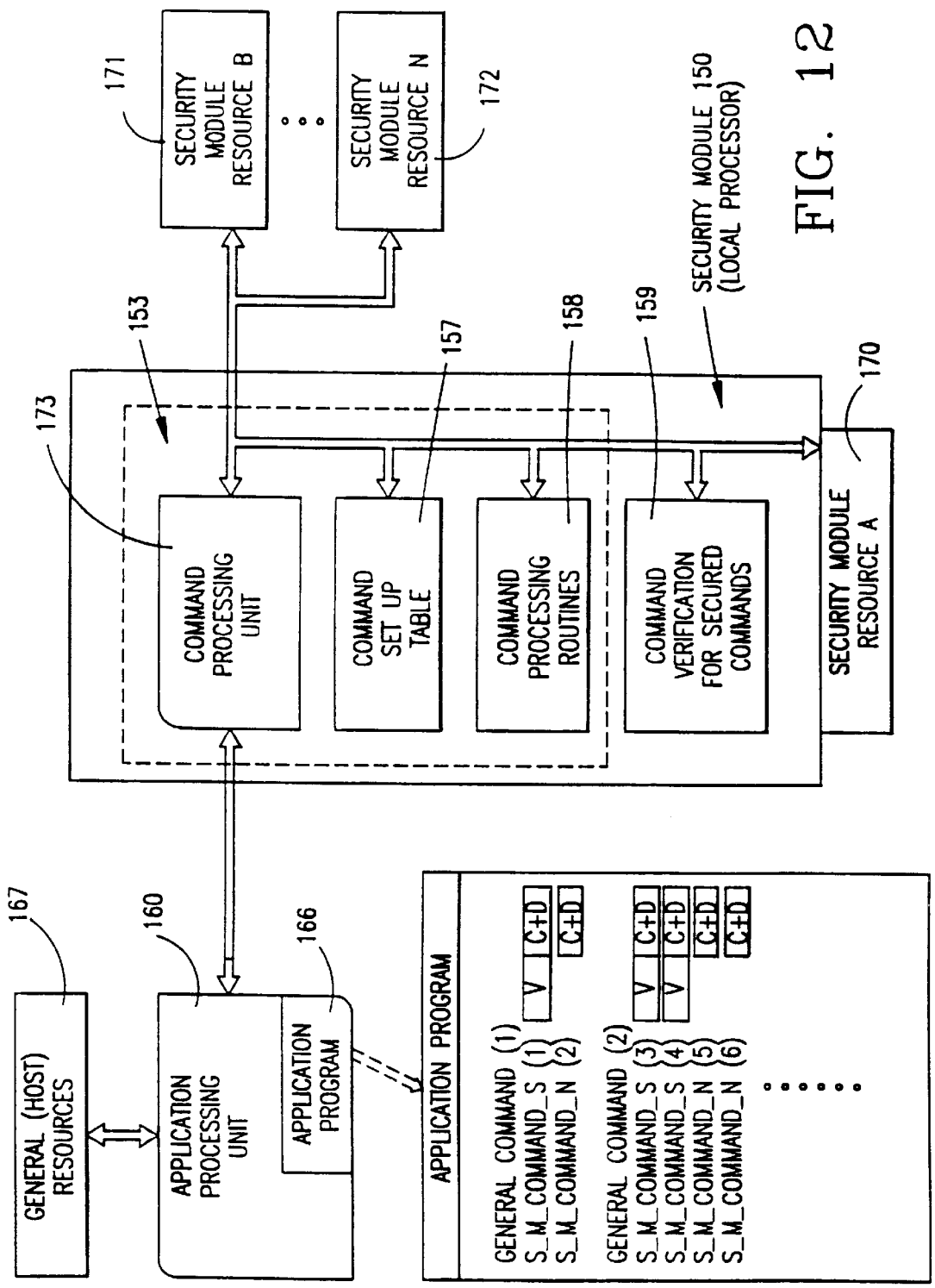
FIG. 12 is a block schematic diagram illustrating one embodiment of shared application program processing and command execution resources of a system utilizing the apparatus and method of this invention.

Referring to FIG. 12, command processor 153 includes a command processing unit 173, a memory section 157 storing a command set up table, and a memory section 158 storing command processing routines. The resource 159 provides command verification for secured commands. This resource is identified generally and shown outside the command processor 153, though some portions of command verification may be performed by command processor 153, e.g. Verify Seq_ID routines, while other portions may be partially or wholly performed in separate chips, e.g. Verify CMD_Auth routines. It should be understood that a number of different architectures can be used in security module 150 and the diagram of FIG. 12 is intended to indicate functional blocks not elements of system architecture.

As shown in FIG. 12, application processing unit 160 has an application software program 166 stored therein. Application software program 166 comprises a sequence of commands which are designated either as a "general command" or a "security module command". Security module commands are abbreviated here as S_M_Command for convenience. General commands are executed in application processing unit 160 and security module commands are sent to security module 150 for processing.

In accordance with this embodiment of the apparatus and method of this invention, security module commands are of two distinct types: secured commands and non-secured commands. Secured commands are designated: "S_M_COMMAND_S" and are security module commands for which the command flag in command set up table 157 designates a command which must be verified before execution, i.e. a secured command. Non-secured commands are designated: "S_M_COMMAND_N" and are security module commands for which the command flag in command set up table 157 designates that the command is to be executed without verification.

Note that each of the commands designated "S_M_COMMAND_S" includes a verification portion designated [V], as well as a command and data portion designated [C+D]. Each of the commands designated "S_M_COMMAND_N" includes only a command and data portion designated [C+D]. Alternatively, a dummy [V] portion can be sent with each command of S_M_COMMAND_N type, though not used or needed and simply discarded by the security module.

The reason for this difference is that the commands of type S_M_COMMAND_S require verification before execution so must include the verification portion of the command. As previously described in connection with the prior embodiments, command verification in accordance with this invention comprises both verification of command sequence and command authenticity. Thus verification portion [V] of the S_M_COMMAND_S command typically includes Cur_Seq_ID, Nxt_Seq_ID, and CMD_Auth elements used in the command verification process.

In this embodiment, the [V] and [C+D] elements of commands of type S_M_COMMAND_S are sent to security module 150 in two sequential message blocks. A command interpreter in command processor 153 receives and stores the elements of security module commands, distinguishing between elements [V] and [C+D] so that they can be stored in two separate buffers if both are present, or the [C+D] element alone is stored in its associated buffer. This preferred, but not mandatory, feature of this embodiment of the invention, makes it easier to conduct an audit on the secured commands because it segregates the command and data from the digital signature associated with the command.

Figure 13:
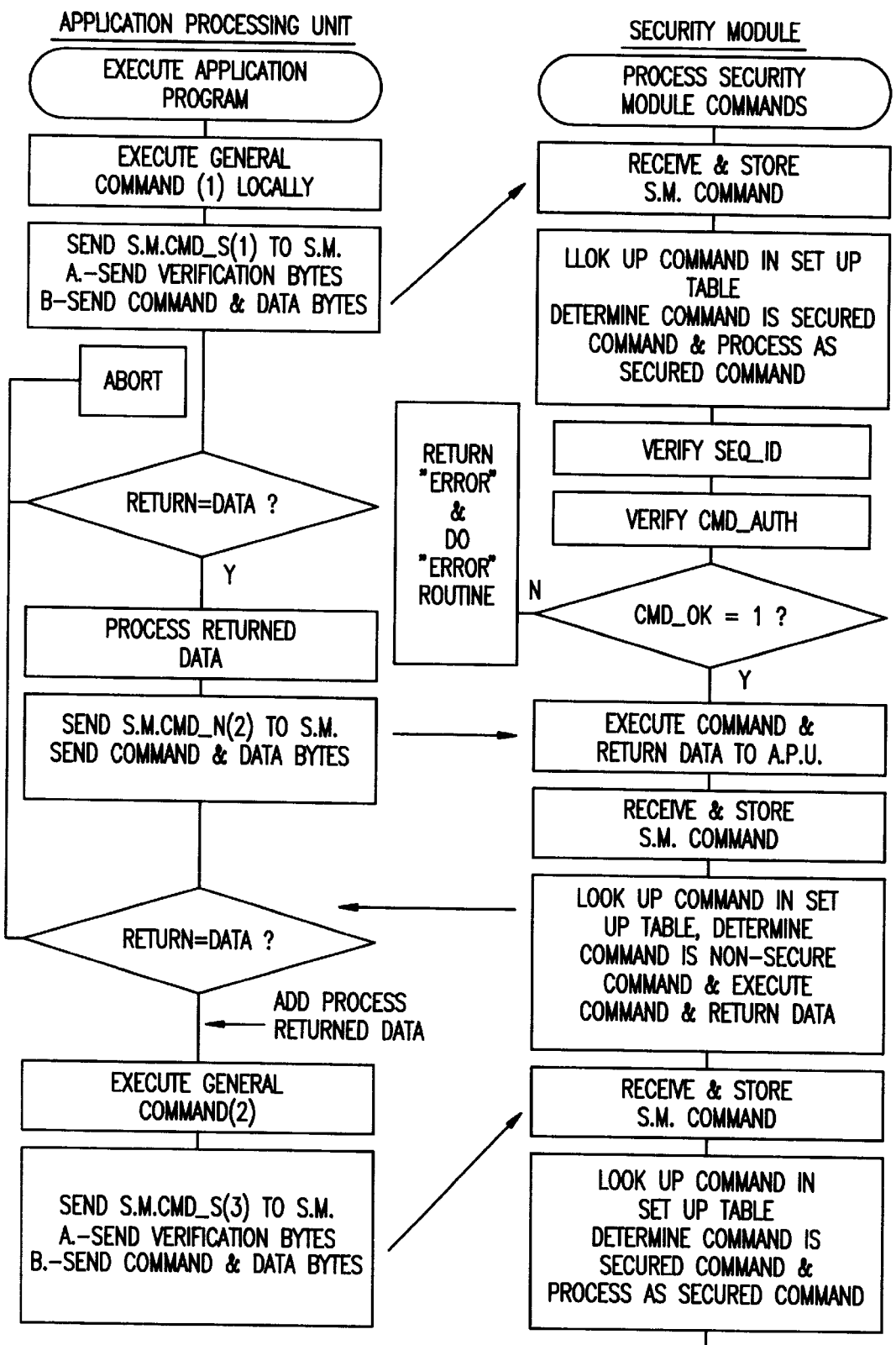
FIG. 13 is a software flow chart illustrating another embodiment of the operation of a security module and application processing unit in accordance with this invention.

Processing of commands of application software program 166 by application processing unit 160 and security module 150 is illustrated in FIG. 13. Application processing unit 160 is executing a routine called EXECUTE APPLICATION PROGRAM. Security module 150, and more specifically the command processor 153 therein, is executing a routine called PROCESS SECURITY MODULE COMMANDS.

Application processing unit 160 fetches the first command of application software program 166 and determines that it is a general command and thus executes this command locally. The next command is a security module command of type S_M_COMMAND_S with both [V] and [C+D] elements. Thus, in two sequential operations, application processing unit 160 sends the command verification elements to security module 150 and the command and data elements and waits for a return of data from security module 150. Security module 150 receives and stores the security module command and then looks at the flag for that command in command set up table 157. The command set up table 157 shows the flag value for this command designating it as a secured command. Consequently, security module 150 processes the command as a secured command by going through separate steps to Verify Seq_ID and Verify CMD_Auth. This is similar to the processing of secured commands in the prior embodiments, the difference being the step of looking up the command in command set up table 157.

If the Verify Seq_ID and Verify CMD_Auth steps result in a determination that the secured command is okay, i.e. it passes both tests of sequence and authenticity, then the command is executed and data returned to application processing unit 160. If the command is not verified, then an error is returned and reset or reboot executed. Application processing unit 160 checks if data is returned and aborts the program if an error has occurred. Alternatively, security module 150 may execute one of several 'bad command' routines as discussed below.

Assuming that S_M_COMMAND_S(1) was okay and executed in security module 150, application processing unit 160 processes the returned data and then sends S_M_COMMAND_N(2) to security module 150. In this case only the [C+D] element needs to be sent since this is not a secured command. The S_M_COMMAND_N(2) is received by security module 150 and stored. The command is looked up in command set up table 157 and is then executed without verifying Seq_ID or CMD_Authenticity and data is returned to application processing unit 160.

Application processing unit 160 receives and processes the returned data and then executes locally the next command of application software program 166 which is a general command. This sequence of parallel operation steps between application processing unit 160 and security module 150 continues until the complete application software program 166 is executed.

Figures 14, 14A:
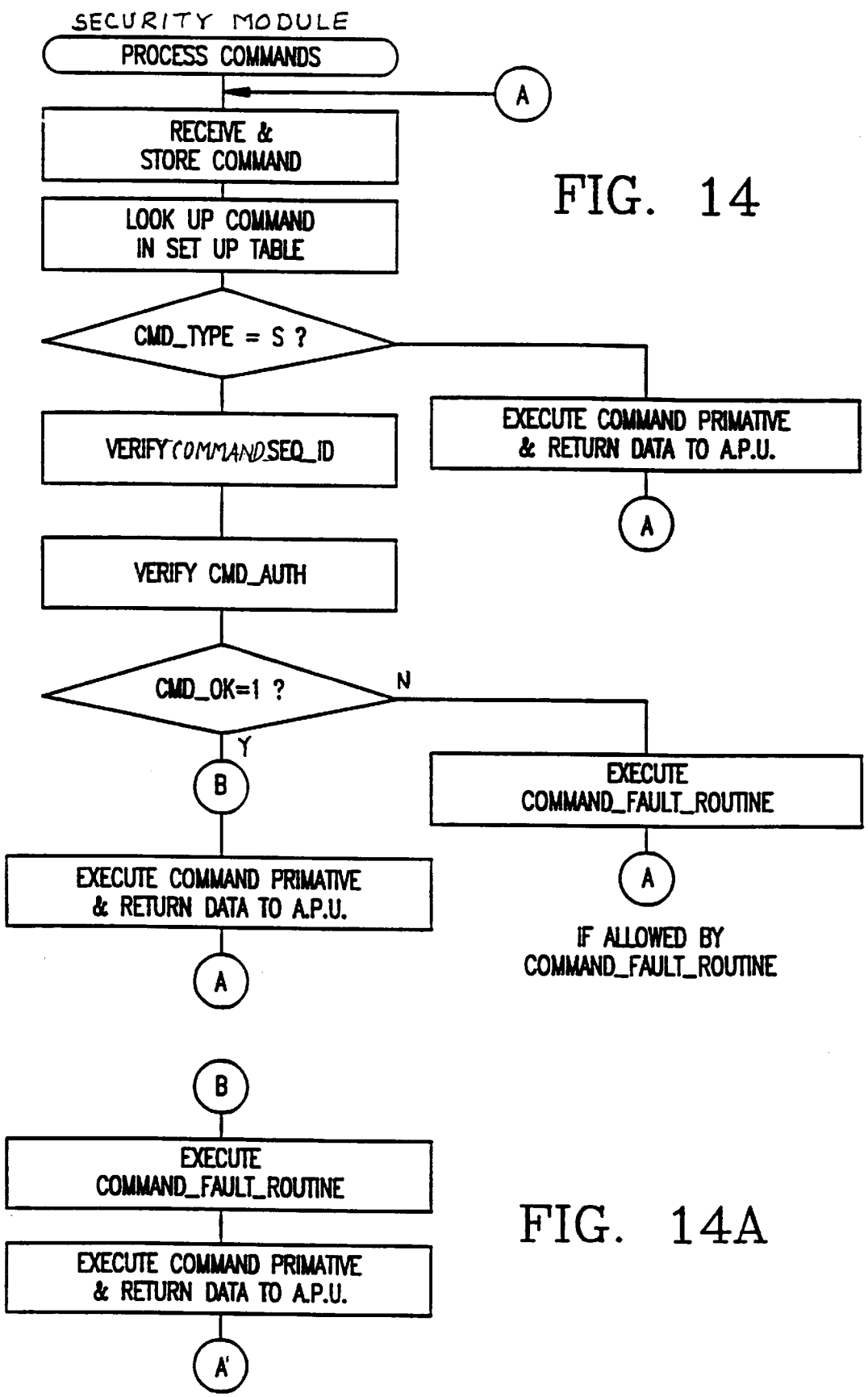
FIG. 14 and FIG. 14A are related software flow charts illustrating a security module command processing routine in accordance with another embodiment of this invention.

Referring now to FIG. 14, a more detailed software routine for processing security module commands in security module 150 will be described. The first step of the routine is to receive and store a command, followed by a step to do a command lookup in the command set up table 157. Next, a checking step is executed to determine if the CMD_TYPE flag value from the command set up table 157 is S. If this step returns NO, then the command primitive associated with the command is executed without further processing of the command.

If the checking step returns YES, then the next sequential steps involve executing routines to verify Seq_ID and CMD_Auth are executed. These routines may be any of the associated routines previously described in connection with other embodiments. The next step is a checking step to determine if the value of the CMD_OK flag is 1. Remember that the command verification routines will set the CMD_OK parameter to a value 0 if either the Seq_ID or CMD_Auth verifications fail. Thus if CMD_OK is not equal to 1, the next step is to execute a prearranged COMMAND_FAULT_ROUTINE, several possible such routines being illustrated in FIGS. 15–17 and discussed below. After executing a COMMAND_FAULT_ROUTINE, the routine returns to point A if allowed by the COMMAND_FAULT_ROUTINE.

If CMD_OK is equal to 1, the associated command primitive is executed and data returned to application processing unit 160. As shown in FIG. 14A, in the case of the COMMAND_FAULT_ROUTINE shown in FIG. 17, which is called a bonus/malus routine (which could alternatively be called an add/subtract or bonus/penalty routine). This PROCESS COMMAND routine must also execute the COMMAND_FAULT_ROUTINE if the secured command is verified as OK. The reason for this will be clear from a discussion below of FIG. 17.

FIG. 15 illustrates a first type of COMMAND_FAULT_ROUTINE (or ERROR ROUTINE in which a fault timer is allowed to time out and then the security module 150 is rebooted after each faulty secured command is detected during command execution. The use of a fault timer is optional and the routine could simply comprise a security module 150 reboot step since a reboot takes several seconds. The delay thus produced reduces the rate at which an attacker can use a trial and error method to attempt to gain access to the function of security module 150 by repeated issuance of fake commands that seek to imitate legitimate secured commands.

However, in this routine there is no step of erasing the secret keys stored in the security module, so this routine does nothing to foil a patient attacker from gaining access to the secrets of security module 150. Furthermore, since it is known that noise and other conditions can produce secured command errors even when processing authorized software commands, this type of COMMAND_FAULT_ROUTINE is not likely to be favored in most operating situations.

FIG. 16 illustrates a second type of COMMAND_FAULT_ROUTINE in which a stored parameter called CMD_FAULT_VAL is decremented each time a faulty secured command is detected. The CMD_FAULT_VAL would be initially preset to a value which would give a satisfactory period of operation under conditions of expected frequency of secured command faults under non-attack conditions. The initialization routine for the system could reset this CMD_FAULT_VAL back to the initial value on a periodic basis to make sure that the secret encryption keys stored in security module 150 are not erased under non-attack conditions.

FIG. 17 illustrates a third type of COMMAND_FAULT_ROUTINE which is referred to as a bonus/malus or add/subtract type of routine. The first step of this routine is to retrieve the value of the CMD_FAULT_VAL parameter. Then a checking step is executed to determine if CMD_OK is 1. If this checking step returns NO because the secured command failed verification tests, then the value of the CMD_FAULT_VAL parameter is decremented by a prearranged "Y" amount. Following this a checking step is executed to determine if CMD_FAULT_VAL is less than or equal to 0.

If this checking step returns NO, then an error is declared to the application processing unit 160. However, if this checking step returns YES, then some predetermined action is taken to foil an apparent attack. One action would be to erase the encryption keys stored in security module 150 to ensure that an apparent attack in progress is foiled. Erasing the keys in this case does not mean that their values are set to zero. Instead it means that the keys are removed from the security module in such a manner that no further authenticity determinations (e.g. MAC calculations) can be carried out by the security module thereafter. Alternatively, an action to lock the security module could be taken so that no further command processing can take place.

If the step of checking whether the value of CMD_OK=1 returns YES because the secured command passed verification tests, then the value of CMD_FAULT_VAL is incremented by a prearranged "X" amount. This is followed by checking step to determine if the current value of CMD_FAULT_VAL is greater than a prearranged maximum value. If this step returns YES, the value of CMD_FAULT_VAL is set to MAX and then a return "OKAY" is executed. If this step returns NO, a return "OKAY" is executed directly. The limitation on incrementing of CMD_FAULT_VAL ensures that the value will not build up over time to such a high value that an actual trial and error attack software program will not be detected by the system.

The advantage of this bonus/malus routine is that the value of CMD_FAULT_VAL will be incremented back to a MAX value during periods when secured commands are being verified consistently under normal application software program execution, even if the value of COMMAND_FAULT_ROUTINE has previously been decremented during a period of noise or other conditions that produce secured command verification failure under non-attack conditions. Good values chosen for the "X" and "Y" and MAX parameters result in considerably increasing the number of steps for trial and error attack while still keeping high immunity to a reasonable number of authentication failures due to noise and other causes.

Example 2 above illustrated the flexibility of the secured command feature of this invention to allow conditional branching based on the data resulting from execution of a prior command.

Figure 18:
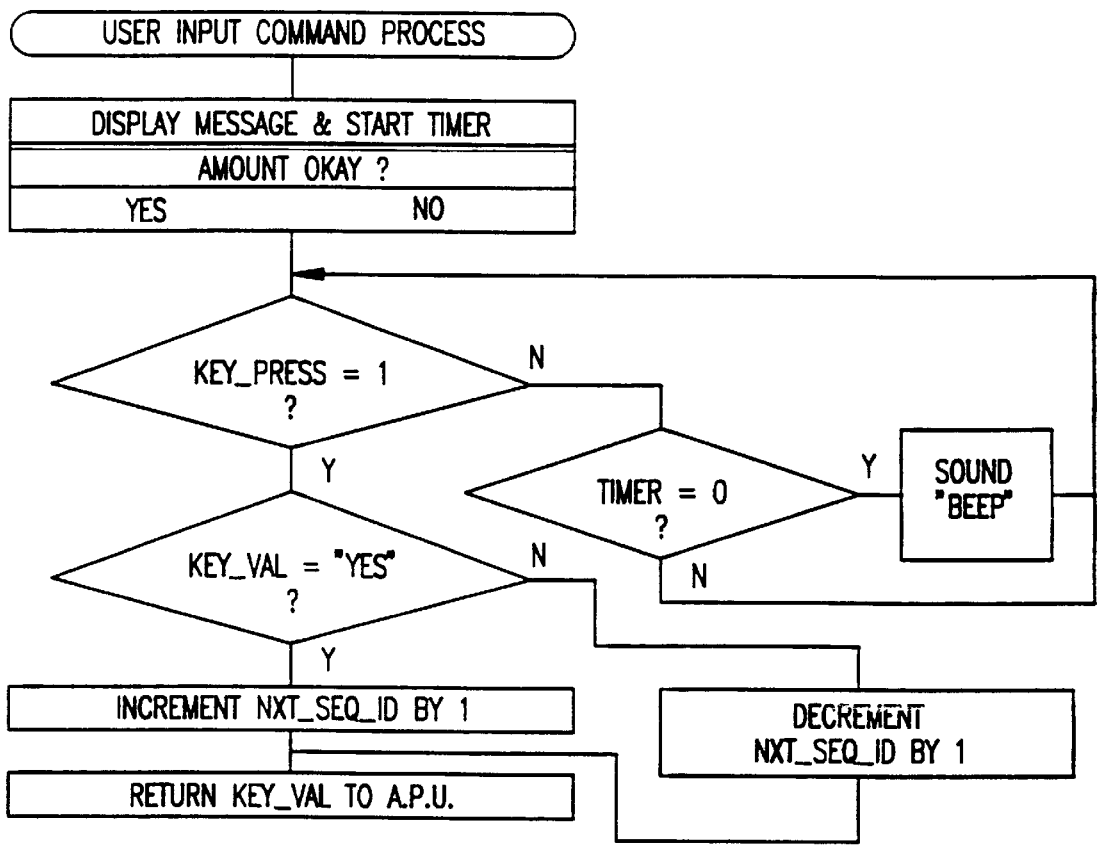
FIG. 18 is a flow chart depicting processing of one command, namely a user input command process, that illustrates the flexibility and power of the apparatus and method of this invention.

FIG. 18 illustrates a secured command routine that initially sets a Nxt_Seq_ID value and then provides for that value to be incremented or decremented by 1 depending on the value of a user input parameter. FIG. 18 illustrates a simple example in which user input is a binary YES/NO. Persons of skill in this art will readily appreciate that more complex conditional branching could be provided with altering of Nxt_Seq_ID by different amounts depending for example on what range a user input amount fell into so that different branching of execution could be allowed depending on the amount value entered. This type of conditional branching could be used to restrict the amount of cash back available to a customer on a debit transaction, and numerous other types of useful point of sale transaction conditions.

Example 3

The following is a program example which is similar to Example 2 above, but utilizes this user input branching feature:

10 Scd_Cmd [001,010, Display_Fxd_Data, "SLIDE CARD", S_MAC_Val (Arg_10)] 20 Get_Card_Rdr_Data 30 Scd_Cmd (010,011, Display_Fxd_Data, "Amount=$", S_MAC_Val (Arg_30)] 40 Scd_Cmd [011,012, Set_cursor_scrd, "8", S_MAC_Val (Arg_40)] 70 Scd_Cmd [012,013, Display_Free_Data, "8,5",'05.25', S_MAC_Val (Arg_70)] 80 Scd_Cmd [013,014, Display_Fxd_Data, "Accept Y/N", S_MAC_Val (Arg_80)] 90 Scd_Cmd [014,015, Config_Kb, 2,77,78, S_MAC_Val (Arg_90)] 100 Scd_Cmd [015,022, Secure_user_input, , S_MAC_Val (Arg_100)]

[COMMENT: The command in line 100 programs the keypad so that only one of two alternative key-presses can be accepted, i.e. those keys corresponding to YES (77) or NO (79). If the YES key is pressed, then the Nxt_Seq_ID is incremented by one and becomes 023. If the NO key is pressed, then Nxt_Seq_ID is decremented by one and becomes 021. Note that there is no Sec_Cmd with Cur_Seq_ID of 022, which means that user input is required. If none, then only error exit to command with Seq_ID=000 remains possible.]

110 If user input is "NO" GOTO 250
     120 Scd_Cmd [023,030, Display_Fxd_Data, "You accepted", S_MAC_Val (Arg_120)] 130 Scd_Cmd [030,031, Display_Fxd_Data, "Enter PIN=", S_MAC_Val (Arg_130)] 140 Scd_Cmd [031,032, Get_Encrypt_PIN, NULL , S_MAC_Val (Arg_ 140)] 150 Print Transaction Receipt 160 Scd_Cmd (040,001, Display_Fxd_Data, "Take Receipt", S_MAC_Val (Arg_160)] 170 GOTO 10
     250 Scd_Cmd [021,001, Display_Fxd_Data, "You refused", S_MAC_Val (Arg_250)] 260 GOTO 10

Figure 19:
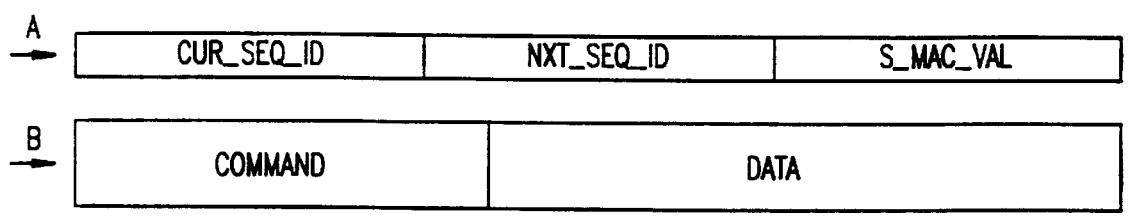
FIG. 19 illustrates a command structure of one embodiment of apparatus and method of this invention.

FIG. 19 illustrates the general form of preferred command structure for the embodiment of the invention described in connection with FIGS. 12–18. As previously indicated, the secured command is sent in two separate messages with part A containing the command verification data and part B containing the command and data. If the command is not a secured command, then part A is not sent to the security module 150, or if sent, is ignored by security module 150 after it determines from lookup in the command set up table 157 that the command does not require verification.

In some applications of the apparatus and method of this invention, it may be necessary or advantageous to send large amounts of data to security module 150. Such is the case if the display under the control of security module 150 is a graphics display and a bit map of a display must be transmitted. In such a case the use of a S_MAC_Val and a T_MAC_Val based on the entire set of data may seriously slow execution of the application software program.

Figure 20:
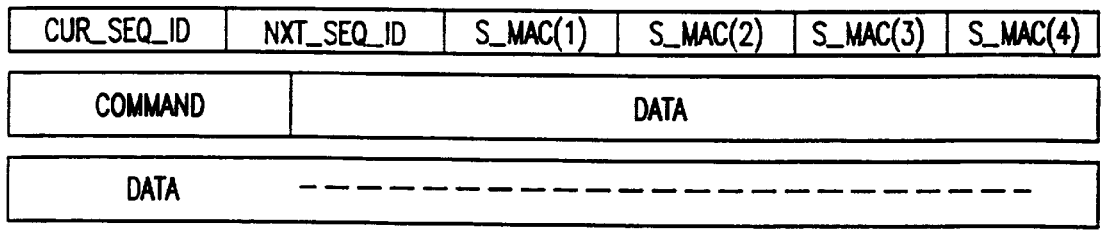
FIG. 20 illustrates a command structure of an alternative embodiment of apparatus and method of this invention.
Figure 21:
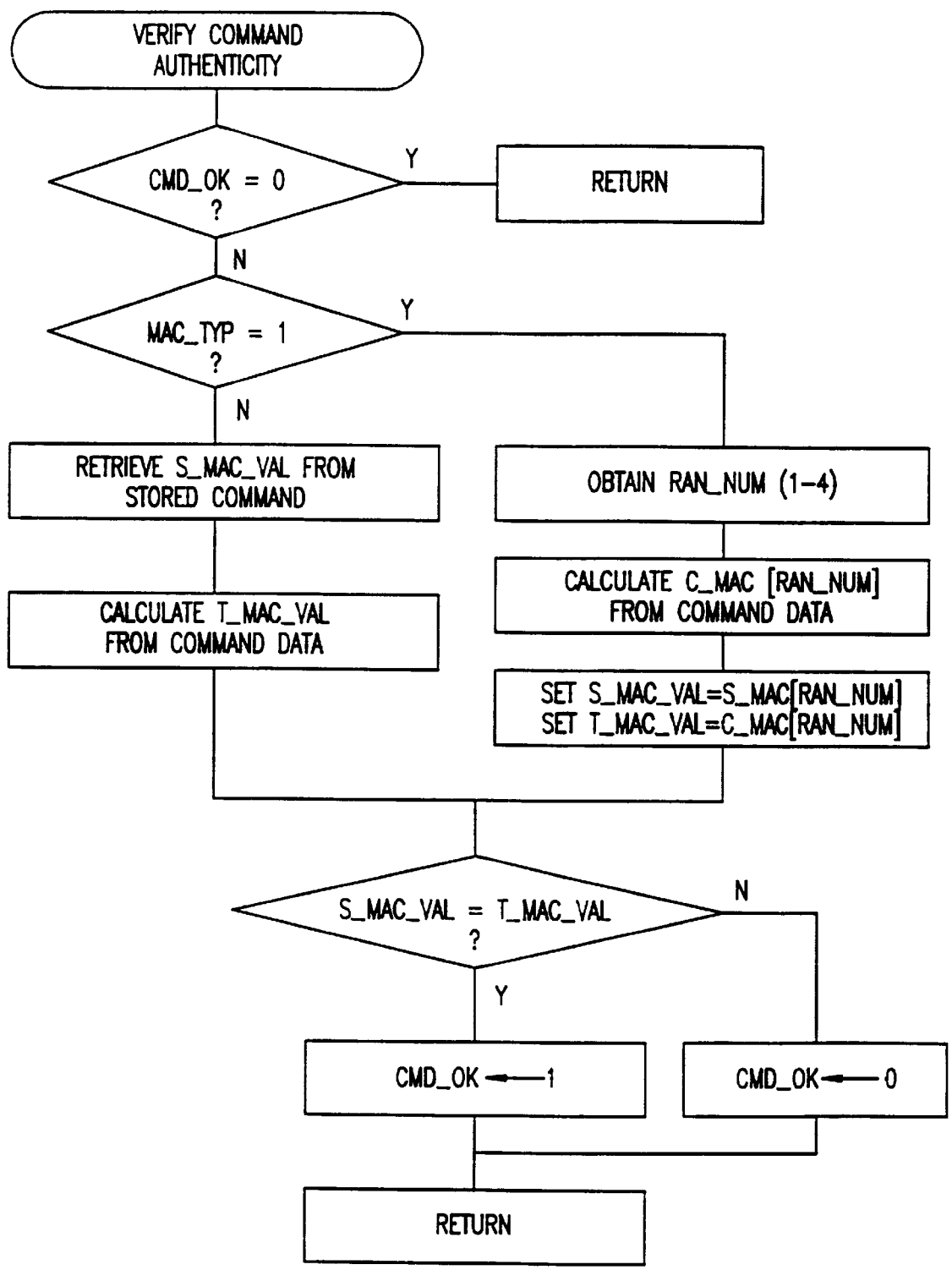
FIG. 21 is a flow chart depicting steps of a routine to verify command authenticity in accordance with this invention and involving random authentication of partial MAC values associated with a command having lengthy data associated therewith.

FIG. 20 illustrates a command with a long data stream following the command parameter with the length of the data depending on the application situation. FIG. 21 illustrates a variation of a VERIFY COMMAND AUTHENTICITY routine which implements what is called random authentication for commands which have large data blocks associated with them. In this case, it is assumed that the data is broken down into four separate authentication blocks with every 4th bit included in a block and a MAC is calculated and sent on each of the four blocks of data as shown in FIG. 20. As is well known, the time involved in a MAC calculation is related to the amount of data over which the MAC is calculated, i.e. the data that is input to the MAC calculation algorithm.

The routine of FIG. 21 first checks the value of CMD_OK to see if it may have been set to 0 in the command sequence ID which was previously executed. Assuming CMD_OK has a value 1 so this checking step returns NO, the routine then checks on the type of MAC associated with the command being authenticated. For illustration, it is assumed that 'normal' authentication (i.e. MAC calculated on all data) is type 0 and random authentication is MAC_TYP=1.

If the checking step on MAC_TYP returns NO, then command verification proceeds as in prior routines. The single S_MAC_Val is obtained from the command verification data stored in its buffer, the T_MAC_Val is calculated based on data received with the command and then a checking step is executed to see if the two are equal. CMD_OK is set to 0 if not equal and to 1 if equal.

However, if the previous MAC_TYP checking step returns YES, then a random or psuedo-random number between 1 and 4 is obtained and a value of C_MAC for that random number is calculated using the same division of command data as was used in calculating the four MACs sent with the command. This MAC value is then set into the parameter T_MAC_Val and S_MAC_Val is set to the value of the corresponding one of the MACs sent with the command. Processing continues with comparison of the two MAC values to determine if they are equal and following processing steps as previously described.

A good pseudo-random number generator is one based on the cryptographic function used for command authentication and it makes the next random guess as hard as breaking the algorithm itself.

As an alternative to this approach, the calculated MAC value T_MAC_Val could be compared with each of the MAC values sent with the command to determine if it is equal to at least one of the four. That is, the command is considered authentic if there is identity between the T_MAC_Val and at least one of the four MAC values received. The steps involved in implementing this alternative approach are obvious and need not be discussed in detail herein.

It will be clear to those skilled in the art that this addition of random authentication provides substantial improvement in performance of a security module 150 which is expected to receive and process commands with large data blocks. Secured commands of this type are authenticated and executed in less time, thus increasing the speed of execution of the overall application program.

It will also be apparent to those skilled in this art that the use of a command set up table in the security module to determine whether a received command is to be authenticated or not greatly enhances the usefulness of the secured commands concept. At the same time, this capability makes it more imperative that adequate auditing of application software programs be carried out to ensure security of operation of the system under each application.

One specific advantages of this feature is that the application software programmer can initially create and debug the application software program in a development unit without any of the commands being processed in the security module as secured commands. Then, when ready for testing with security features in place, the commands to be processed as secured commands can have their parameters reset in the command set up table.

Another advantageous feature is that a secured command can be defined which allows the parameter of a particular command in the command set up table to be changed to turn off or turn on, as the case may be, the requirement for command verification. Security module resources can then be switched on and off as the needs of the application program change during execution.

This feature might appear to make the auditing of an application software program more difficult and critical. The reality is that no change in the degree of difficulty or importance of the security audit of an application software program will is involved in using this feature of the invention.

The secured command apparatus and method of this invention can also be used in software environments other than ones which employ a security module. Referring back to FIG. 12, it should be apparent that the apparatus and method of this invention can be used in any system in which an application program is running in one system, e.g. a host computer system located at one location, and sending commands for execution to a command processing device at a remote location, e.g. a home PC. The remote location would be provided with a secured command interpreter which would process the secured command as does the security module in the embodiments specifically described herein. The reverse is also true in that a home PC could be running the application program and sending secured commands to a host computer for customized home banning and other types of transactions.

The apparatus and method of this invention would provide additional security in any such operational environment, i.e. provide security for the link between the two systems which is the command pathway. Using secured commands would make it more difficult for attackers to seek to gain access to the system receiving the secured commands for purposes of carrying out some fraudulent activity.

Also in the security module environment, additional security could be provided for the security chip therein by incorporating the use of secured commands for invoking the functions of the security chip. A secured command interpreter would be provided in the command execution portion of the chip and make it more difficult for an attacker reaching that point in the system to succeed in gaining access to the secrets of the security chip. It should be apparent from the above description of various embodiments that this invention greatly enhances the flexibility of programming a security module to perform application program functions in a secure manner.

An important aspect of the method of this invention consists in the preparation of the authenticity marker for each secured command which is done outside the target secured device. For example, a separate computer may be employed in this process. The key to be used by the secured device to check command authenticity, or a complementary key, is used to calculate the authenticity marker for each command. This key is then injected into the target secured device to enable it to accept secured commands containing the calculated authenticity markers. A secured device without an injected key or one having a fake key will be unable to execute any secured commands.

Typically, all devices in a blank state (i.e. new, never used devices are secure because the command set up table has flag value settings for all commands to be secured commands. Furthermore, no commands can be executed by a blank device since it lacks the key required to verify command authenticity. The blank devices are converted to usable devices by loading personalization software and a key with security provided by properly designing the set-up process of the device.

Persons of skill in this art could make numerous changes in the implementations and construct many different alternative embodiments using the general principles of the invention discussed above and set forth in the appended claims.

We claim:

1. A method for operating a set of resources under the control of a secure processor having a command authentication means and a command execution means, said method comprising the steps of:
   a. providing in said security module a set of command primitives for functional control of said set of resources, each of said command primitives having an associated set of command data items;
   b. defining a secured command format for commands to invoke said command primitives, said secured command format including a command sequence ID, a command code, and a set of command data items;
   c. preparing an application program comprising a sequence of secured commands each having said secured command format;
   d. sending said sequence of secured commands one at a time to said secure processor for execution;
   e. testing the authenticity of each of said secured commands based on the value of at least one element of said secured command using said command authentication means,
   f. testing the regularity of each of said secured commands based on the value of said command sequence ID, and
   g. executing the command primitive associated with said command code in each of said secured commands, using said command execution means, if and only if said secured command passes both said testing steps e and f.

2. The method of claim 1, wherein said sequence of commands in said application program are required to be executed by said secure processor in an ordered numerical sequence;

and said step f is carried out by testing whether the value of said command sequence ID is equal to the value of a next command sequence ID maintained in said secure processor and incremented by the value 1 each time a secured command is executed.

3. The method of claim 1, wherein said command sequence ID in said secured command format is a current command sequence ID and said secured command format further includes a next command sequence ID, said step f. comprises testing whether the value of said current command sequence ID is equal to the value of the next command sequence ID from the last secured command executed by said secure processor; and said step g further includes the step of g.1. storing said next command sequence ID if said secured command passes said testing step f;

whereby said application program may comprise a series of secured commands having a set of execution path branches.

4. The method of claim 1, wherein said step c. includes encrypting at least a portion of each of said secured commands including at least said command sequence ID; and said steps e. and f. are carried out by the steps of decrypting said command sequence ID and testing the regularity of said secured command based on the decrypted value of said command sequence ID, and thereby simultaneously testing the authenticity of said secured command.

5. The method of claim 1, wherein said secured command format includes an authenticity mark common to each secured command;

said step c. includes encrypting at least a portion of each of said secured commands including at least said authenticity mark;

and said step f. is carried out by the steps of:
   f.1. decrypting said encrypted authenticity mark in each of said secured commands, and
   f.2. testing whether the decrypted value corresponds to an expected value of said authenticity mark stored in said secure processor.

6. The method of claim 1, wherein said secured command format includes a message authentication code signature value calculated using an encryption key and at least a portion of the content of said secured command; and said step f. is carried out by the steps of
   f.1. calculating a test message authentication code signature value using the same or paired encryption key stored in said secure processor and said portion of the content of said secured command received by said secure processor, and
   f.2. testing whether said message authentication code signature value from said secured command matches said test message authentication code signature value.

7. A method for operating a set of resources under the control of a secure processor, having a command authentication means and a command execution means, to achieve secure control of said resources, said method comprising the steps of:
   a. providing in said secure processor a set of command primitives for functional control of said set of resources, each of said command primitives having an associated set of command data items;
   b. defining a set of commands to invoke said command primitives;
   c. defining a secured command format for said commands including at least a command sequence ID, a command code, and a set of command data items;
   d. defining a non-secured command format for said commands including a command code and a set of command data items;
   e. storing in said secure processor a command set up table including for each of said commands in said set of commands or for groups of said command, a command type flag having a first value if said command is to be processed as a secured command and a second value if said command is to be processed as a non-secured command;
   f. preparing an application program which includes a plurality of said commands each having one of said secured command format or said non-secured command format;
   g. sending said sequence of commands one at a time to said secure processor for execution;
   h. looking up each of said commands in said command set up table when said command is received by said secure processor;
   i.1. if step h. determines that said command is a non-secured command, executing a set of command primitive associated with said non-secured command using said command execution means; and
   i.2. if step h. determines that said command is a secured command,
      i.2.a. testing the authenticity of said secured command based on the value of at least one element of said secured command using said command authentication means,
      i.2.b. testing the regularity of said secured command based on the value of said command sequence ID, and
      i.2.c. executing a set of command primitive associated with said secured command using said command execution means, if and only if said secured command passes both said testing steps i.2.a. and i.2.b.

8. The method of claim 7, wherein
said application program includes a sequence of commands in said secured command format which are required to be executed by said secure processor in an ordered numerical sequence;
and said step i.2.b. is carried out by testing whether the value of said command sequence ID is equal to the value of a next command sequence ID maintained in said secure processor and incremented by the value 1 each time a secured command is executed.

9. The method of claim 7, wherein
said command sequence ID in said secured command format is a current command sequence ID and said secured command format further includes a next command sequence ID,
said step i.2.b. comprises testing whether the value of said current command sequence ID is equal to the value of the next command sequence ID from the last secured command executed by said secure processor; and
said step i.2.b. further includes storing said next command sequence ID if said secured command passes said testing step 1.2.b.
whereby said application program may comprise a series of secured commands having a set of execution path branches.

10. The method of claim 7, wherein
said secured command format includes a message authentication code signature value calculated using an encryption key and at least a portion of the content of said secured command; and
said step i.2.a. is carried out by the steps of
   i.2.a(1) calculating a test message authentication code signature value using one of the same or paired encryption key stored in said secure processor and said portion of the content of said secured command received by said secure processor, and
   i.2.a(2) testing whether said message authentication code signature value from said secured command matches said test message authentication code signature value.

11. The method of claim 7, wherein
said secured command format includes a message authentication signature element having one of
   a first format comprising a message authentication code calculated using an encryption key and at least a prearranged portion of the set of command data items, and a second format comprising a plurality 'n' of message authentication codes each calculated on a prearranged unique subset of said set of command data items; and
said step i.2.a. is carried out by the steps of:
   i.2.a(1) determining the format of said message authentication signature element; and
   i.2.a(2) if said first format is determined, then performing the steps of:
      i.2.a(2)-1 calculating a test message authentication code using one of the same or a paired encryption key stored in said secure processor and said prearranged portion of the the set of command data items, and
      i.2.a(2)-2 testing whether said message authentication code calculated in step i.2.a(2)-1 matches said message authentication code of said secured command; and
   i.2.a(3) if said second format is determined, then performing the steps of:
      i.2.a(3)-1 obtaining one of a random or pseudo-random number in the range 1 to 'n';
      i.2.a(3)-2 calculating a test message authentication code using the one of the same or a paired encryption key stored in said secure processor and one of said subsets of command data items associated with said random or pseudorandom number obtained in step i.2.a(3)-1;
      i.2.a(3) testing whether said message authentication code calculated in step i.2.a(3)-2 matches one of said plurality of message authentication codes received with said secured command.

12. The method of claim 7, further comprising the steps of
   j. defining a command fault parameter associated with failure of a secured command to pass authenticity testing step i.2.a.;

k. decrementing said command fault parameter by a preset amount each time a secured command received by said secure processor fails to pass testing step i.2.a.; and l. implementing a prearranged attack defeat action in said secure processor if said command fault parameter declines to a prearranged value.

13. The method of claim 12, further comprising the step of k.1. incrementing said command fault parameter by a preset second amount each time a secured command received by said secure processor successfully passes testing step i.2.a.; and k.2. limiting the value of said command fault parameter to be less than a prearranged upper limit value.

14. A method for operating a set of resources under the control of a security module, having a signature authentication means therein, by means of commands sent from an application processing unit to said security module, said method comprising the steps of:

a. selecting a set of resources to be security module resources operated under the control of said security module;

b. defining a set of command primitives for functional control of said security module resources, including a set of command data items associated with each of said command primitives;

c. loading said command primitives into said security module;

d. defining a secured command format for commands to invoke said command primitives, said secured command format including a command sequence ID, a command code, a set of command execution data items, and a command authenticity data item;

e. providing in said security module a command execution program means for e.1. interpreting a received command having said secured command format;

e.2. testing the authenticity of said command by using said command authenticity data item and said command authentication means, e.3. testing the regularity of said command based on the value of said current command sequence ID, and e.4. executing the command primitive associated with said command code in said command if and only if said command passes testing steps e.2. and e.3.;

f. preparing an application software program including a plurality of secured commands written in said secured command format and having a predefined sequence for operating one or more of said secured resources in said predefined sequence;

g. subjecting each of said secured commands of said application software program to a cryptographic security process to create and insert into each of said secured commands said command authenticity data item;

h. loading said application software program into a command processing unit having a command communication pathway to said security module;

i. executing said application software program on said command processing unit to send said secured commands one at a time to said security module for execution therein.

15. A method for operating a set of resources under the control of a security module, having a signature authentication means therein, by means of commands sent from an application processing unit to said security module, said method comprising the steps of:

a. selecting a set of resources to be security module resources operated under the control of said security module;

b. defining a set of command primitives for functional control of said security module resources, including a set of command data items associated with each of said command primitives;

c. loading said command primitives into said security module;

d. defining a set of commands to invoke said command primitives;

e. defining a secured command format for said commands, said secured command format including a command sequence ID, a command code, a set of command execution data items, and a command authenticity data item;

f. defining a non-secured command format for said commands including a command code and a set of command data items;

g. storing in said secure processor a command set up table including for each of said commands in said set of commands a command type flag having a first value if said command is to be processed as a secured command and a second value if said command is to be processed as a non-secured command;

h. providing in said security module a command execution program means for h.1. receiving a command;

h.2. looking up said command in said command set up table to determine if said command is a secured command;

h.3. if step h. determines that said command is a non-secured command, then executing the command primitive associated with said command using said command execution means; and h.4. if step h. determines that said command is a secured command, then h.4.a. testing the authenticity of said secured command using said command authenticity data item and said command authentication means;

h.4.b. testing the regularity of said secured command based on the value of said current command sequence ID, and h.4.c. executing the command primitive associated with said secured command using said command execution means, if and only if said secured command passes steps h.4.a. and h.4.b.

i. preparing an application software program including a plurality of said secured commands written in said secured command format and having a predetermined sequence for operating one or more of said security module resources in said predefined sequence;

j. subjecting each of said secured commands of said application software program to a security process to create and insert into each of said secured commands said command authenticity data item;

k. loading said application software program into a command processing unit having a command communication pathway to said security module;

l. executing said application software program on said command processing unit to send said secured commands one at a time to said security module for execution therein.

16. A secure processor apparatus for controlling the operation of a set of secure resources in response to secured commands communicated thereto from a application processing unit which stores an application software program comprising a sequence of said secured commands, said secured commands having a predefined secured command format comprising a command sequence ID, a command code, and a set of command execution data items;

said security module having interface means for interfacing with each of said secured resources;

a command authentication means;

means for storing a predefined set of command primitives for functional control of said set of secured resources, each of said command primitives having an associated set of command data items required for execution thereof and being associated with one of said secured commands;

means for storing a command execution program comprising
means for interpreting a command received from said application processing unit in said secured command format,
means for testing the authenticity of said command based on the value of at least ones element of said secured command using said command authentication means,
mean for testing the regularity of said command based on the value of said command sequence ID, and
means for executing the command primitive associated with said command code in said command if and only if said command passes both the authenticity testing and the regularity testing of said command execution program.

17. Apparatus as claimed in claim 16, wherein said command execution program requires all secured commands of said application software program to be executed in an ordered numerical sequence;

and said means for testing the regularity of said command comprises
means for tracking the value of a next command sequence ID for the next command in said ordered numerical sequence, and
means for testing whether the value of said command sequence ID is equal to the value of said next command sequence ID.

18. Apparatus as claimed in claim 16, wherein said command sequence ID in said secured command format is a current command sequence ID and said predefined secured command format further includes a next command sequence ID, said means for testing the regularity of said command comprises buffer means for storing the next command sequence ID contained in the previous secured command processed by said security module; and means for testing whether said current command sequence ID is equal to said next command sequence ID stored in said buffer means and providing a command OK signal if[] said testing returns YES; and means for loading said next command sequence ID from said current command into said buffer means;

whereby said application program may comprise a series of secured commands having ;a prearranged set of execution path branches.

19. Apparatus as claimed in claim 16, wherein said predefined secured command format includes an authenticity mark common to each secured command, said security module includes means storing the value of said authenticity mark, each of said secured commands in said application software program includes an encrypted version of said authenticity mark; and said means for testing the authenticity of said command comprises
means for decrypting said encrypted authenticity mark to produce a decrypted authenticity mark value, and
means for testing whether said decrypted authenticity mark value matches said authenticity mark stored in said security module.

20. Apparatus as claimed in claim 16, wherein said security module includes
means for storing an encryption key value for calculating message authentication code signatures;
said predefined secured command format includes a message authentication code signature value;
each of said secured commands in said application software program includes a message authentication code signature precalculated using one of the same encryption key or a paired key and at least a portion of the content of said secured command; and
said means for testing the authenticity of said command comprises
means for calculating a test message authentication code signature value using said encryption key stored in said security module and said portion of the content of said secured command received by said security module,
means for testing whether said message authentication code signature value from said secured command matches said test message authentication code signature value.

21. A secure processor apparatus for controlling the operation of a set of resources in response to commands communicated thereto from a separate application processing unit which stores an application software program comprising a plurality of commands from, a prearranged set of commands, said commands having one of a pair of predefined command formats comprising
a first command format associated with a secured command and comprising at least a command sequence ID, a command code, and a set of command data items;
a second command format associated with a non-secured command including a command code and a set of command data items;

said secure processor apparatus having
interface means for interfacing with each of said secured resources;
a secured command authentication means;
means for storing a predefined set of command primitives for functional control of said set of secured resources, each of said command primitives having an associated set of command data items required for execution thereof and being associated with one of said commands;
means for storing a command set up table including for each of said commands in said set of commands a command type flag having a first value if said command is to be processed as a secured command and a second value if said command is to be processed as a non-secured command;

command execution program means comprising
  means for receiving and storing a command from said application processing unit;
  command look up means for looking up said command in said command set up table to determine if said command is secured command or a non-secured command;
  authenticity testing means for testing the authenticity of a secured command based on the value of at least one element of said secured command using said command authentication means,
  regularity testing means for testing the regularity of a secured command based on the value of said command sequence ID, and
  means for executing a set of command primitives associated with said command code in said command without use of said authenticity testing means or said regularity testing means if said command look up means determines that said command is a non-secured command and for executing said command primitive if and only if said command passes the tests of both said authenticity testing means and said regularity testing means if said command look up means determines that said command is a secured command.

22. Apparatus as claimed in claim 21, wherein said command sequence ID in said first command format is a current command sequence ID and said first command format further includes a next command sequence ID, said regularity testing means comprises means
  sequence ID buffer means for storing the next command sequence ID received from the previous secured command executed;
  means for determining if the value of said current command sequence ID in a received command is equal to the value of the next command sequence ID in said sequence ID buffer means and declaring a Command Fault if not equal and, if equal, declaring a Command Okay and storing said next command sequence ID in said sequence ID buffer;
  whereby said application program may comprise a series of secured commands having a set of different execution path branches.

23. Apparatus as claimed in claim 21, wherein said secure processor apparatus stores an encryption key;

said first command format includes a message authentication code signature value calculated using one of said encryption key or a paired key and at least a portion of the content of said secured command; and and said authenticity testing means comprises
  means for calculating a test message authentication code signature value using said encryption key stored in said secure processor and said portion of the content of said secured command received by said secure processor, and
  means for testing whether said message authentication code signature value from said secured command matches said test message authentication code signature value and declaring a Command Fault if not equal and, if equal, declaring a Command OK.

24. Apparatus as claim in claim 21, wherein said secure processor apparatus stores an encryption key;

said secured command format includes a message authentication signature element having one of
  a first MAC format comprising a single message authentication code calculated using said encryption key and at least a prearranged portion of the set of command data items, and
  a second MAC format comprising a plurality 'n' of message authentication codes each calculated on a prearranged unique subset of said set of command data items; and said authenticity testing means comprises
    means for determining the format of said message authentication signature element; and
    means for authenticity testing a command in said first MAC format including
      MAC calculating means for calculating a test message authentication code using said encryption key stored in said secure processor and said prearranged portion of the the set of command data items, and
      means for determining whether said message authentication code calculated by said MAC calculating means is equal to said message authentication code of said secured command; and
    means for authenticity testing of a command in said second MAC format including p4 random number means for obtaining one of a random number or pseudorandom number in the range 1 to 'n';
      MAC calculating means for calculating a test message authentication code using said. encryption key stored in said secure processor and a particular one of said subsets of command data items associated with said random number obtained in by said random number means; and
      means for testing whether said message authentication code calculated by said MAC calculating means matches one of said plurality of message authentication codes received with said secured command.

* * * * *